United States Patent
Shinde et al.

(10) Patent No.: US 12,487,967 B1
(45) Date of Patent: Dec. 2, 2025

(54) EFFICIENT FILE SYSTEM DIRECTORY REVERSE NAME LOOKUP

(71) Applicant: Cohesity, Inc., San Jose, CA (US)

(72) Inventors: Siddesh Shinde, San Jose, CA (US); Zhihuan Qiu, Lake Oswego, OR (US)

(73) Assignee: Cohesity, Inc., Santa Clara, CA (US)

( * ) Notice: Subject to any disclaimer, the term of this patent is extended or adjusted under 35 U.S.C. 154(b) by 0 days.

(21) Appl. No.: 18/962,671

(22) Filed: Nov. 27, 2024

(51) Int. Cl.
*G06F 16/14* (2019.01)
*G06F 16/17* (2019.01)

(52) U.S. Cl.
CPC ........ *G06F 16/152* (2019.01); *G06F 16/1734* (2019.01)

(58) Field of Classification Search
CPC ..................................... G06F 16/152
USPC ......................................... 707/822
See application file for complete search history.

(56) References Cited

U.S. PATENT DOCUMENTS

| | | | | |
|---|---|---|---|---|
| 7,228,299 | B1 * | 6/2007 | Harmer | G06F 16/148 707/999.102 |
| 7,590,652 | B2 * | 9/2009 | Passey | G06F 16/13 707/999.102 |
| 8,938,416 | B1 * | 1/2015 | Cole | G06F 16/2255 707/747 |
| 10,318,491 | B1 * | 6/2019 | Graham | G06F 16/182 |
| 10,691,639 | B1 * | 6/2020 | Cronan | G06F 16/13 |
| 11,016,946 | B1 * | 5/2021 | Graham | G06F 16/278 |
| 12,360,982 | B1 * | 7/2025 | Jujjuri | G06F 16/24552 |
| 2008/0046445 | A1 * | 2/2008 | Passey | G06F 16/13 |
| 2012/0185437 | A1 * | 7/2012 | Pavlov | G06F 16/182 707/652 |
| 2013/0103729 | A1 * | 4/2013 | Cooney | G06F 16/252 707/831 |
| 2017/0262461 | A1 * | 9/2017 | Androulaki | G06F 16/134 |

(Continued)

FOREIGN PATENT DOCUMENTS

| | | | | |
|---|---|---|---|---|
| CN | 114490514 | A * | 5/2022 | ............ G06F 16/113 |
| CN | 115481089 | A * | 12/2022 | ............ G06F 16/164 |

(Continued)

OTHER PUBLICATIONS

Sun et al., "MetaFlow: A Scalable Metadata Lookup Service for Distributed File Systems in Data Centers", IEEE Transactions on Big Data, vol. 5, No. 2, April-Jun. 2018, pp. 203-216. (Year: 2018).*

(Continued)

*Primary Examiner* — Phuong Thao Cao
(74) *Attorney, Agent, or Firm* — Shumaker & Sieffert, P.A.

(57) ABSTRACT

Techniques are disclosed for efficient file system directory reverse name lookup. An example method includes storing, at one or more of a plurality of storage locations of a key map, a file system directory including one or more key-value pairs, wherein each key-value pair of the file system directory maps a respective object identifier to corresponding object metadata; and in response to detecting an indication of a file system event for a file: storing, to a storage location of the key map, a key-value pair that maps an object identifier of the file to object metadata of the file; generating, based on the object identifier, an indication of the storage location; including, by the data platform, the indication of the storage location in the object metadata; and storing, by the data platform, the object metadata to a data store.

20 Claims, 5 Drawing Sheets

(56) References Cited

U.S. PATENT DOCUMENTS

| | | | |
|---|---|---|---|
| 2017/0316028 A1* | 11/2017 | Kanteti | G06F 3/067 |
| 2018/0032540 A1* | 2/2018 | Geldman | G06F 16/137 |
| 2019/0079831 A1* | 3/2019 | Madduri | G06F 16/273 |
| 2019/0095460 A1* | 3/2019 | Wang | G06F 3/0647 |
| 2021/0004354 A1* | 1/2021 | Cronan | G06F 16/13 |
| 2024/0111728 A1* | 4/2024 | Hickey | G06F 16/162 |

FOREIGN PATENT DOCUMENTS

| | | | | |
|---|---|---|---|---|
| CN | 118964297 A | * | 11/2024 | G06F 16/172 |
| KR | 20230059007 A | * | 5/2023 | H04L 61/457 |
| TW | 202340934 A | * | 10/2023 | G06F 3/061 |
| WO | WO-2012068184 A1 | * | 5/2012 | G06F 16/1844 |
| WO | WO-2021262582 A1 | * | 12/2021 | G06F 8/41 |
| WO | WO-2024022330 A1 | * | 2/2024 | G06F 3/0673 |

OTHER PUBLICATIONS

Zhang et al., "PetaKV: Building Efficient Key-Value Store for File System Metadata on Persistent Memory", IEEE Transactions on Parallel and Distributed Systems, vol. 34, No. 3, Mar. 2023, pp. 843-855. (Year: 2023).*

* cited by examiner

EFFICIENT FILE SYSTEM DIRECTORY REVERSE NAME LOOKUP

TECHNICAL FIELD

This disclosure relates to data platforms for computing systems.

BACKGROUND

Data platforms that support computing applications rely on primary storage systems to support latency sensitive applications. However, because primary storage is often more difficult or expensive to scale, a secondary storage system is often relied upon to support secondary use cases such as snapshots and archives. Due at least in part to the scale of data supported by data platforms, file system operations may be resource intense in terms of processing, storage, and/or communication infrastructure.

SUMMARY

Aspects of this disclosure describe techniques for efficient file system directory reverse name lookup. With some file system associative data structures (e.g., hashmaps), while forward lookups (key-to-value) may be efficient due to the direct mapping of keys to their respective buckets, reverse lookups (value-to-key) may be inefficient. The inefficiency may arise because reverse lookups require exhaustively (e.g., linear or other brute force manner) traversing through all the buckets of the associative data structure to locate the key-value pair corresponding to a given value pointer, leading to increased computational overhead and slower retrieval time (e.g., increased latency).

The techniques described herein provide efficient reverse name lookup by storing a key hash of a key of a key-value pair as part of the value of the key-value pair. By embedding the hash of the key in its associated value, a data platform may more efficiently determine which bucket the key belongs to without having to traverse an entire associative data structure, which may significantly enhance the efficiency of locating the bucket containing the key-value pair in the associative data structure. For example, the data platform may use the key hash as a unique identifier that maps directly to the bucket containing the key-value pair corresponding to the key and use the key hash to retrieve the key-value pair from the identified bucket. Consequently, the described techniques may reduce computational overhead and reduce latency for reverse lookups by possibly eliminating the need for exhaustive traversals across all buckets of an associative data structure to find the desired key-value pair.

The described techniques may provide one or more technical advantages that realize a practical application. For example, an associative data structure for a file system may include a substantial number of entries correlated to the amount of data in the file system. For instance, for each file in a file system several (e.g., 4, 8, 16+) associative data structure entries, which provide mappings (e.g., pointers or references) to metadata for each file, may be required. Some file systems, such as enterprise file systems may include several terabytes, petabytes, or more of individual files. A data platform may use reverse lookups during garbage collection, replication, and other file system operations. The described techniques may improve the latency (e.g., increase speed) and efficiency (e.g., reduce consumption of compute and memory resources) of reverse lookups in general and accordingly also improve the latency and efficiency of file system operations that use reverse lookups.

In one example, this disclosure describes a method comprising: storing, by a data platform implemented by a computing system and at one or more of a plurality of storage locations of a key map, a file system directory including one or more key-value pairs, wherein each key-value pair of the file system directory maps a respective object identifier to corresponding object metadata, wherein the respective object identifier identifies a respective file of a plurality of files stored to the data platform; detecting, by the data platform, an indication of a file system event for a file of the plurality of files; and in response to detecting the indication of the file system event: storing, by the data platform and to a storage location of the key map, a key-value pair that maps an object identifier of the file to object metadata of the file; generating, by the data platform and based on the object identifier of the file, an indication of the storage location of the key map; including, by the data platform, the indication of the storage location of the key map in the object metadata for the file, wherein the indication of the storage location of the key map is used to permit retrieval of the key-value pair that maps the object identifier of the file to the object metadata of the file using the object metadata for the file; and storing, by the data platform, the object metadata for the file to a data store In another example, this disclosure describes a computing system comprising a memory storing instructions; and processing circuitry that executes the instructions to: store, at one or more of a plurality of storage locations of a key map, a file system directory including one or more key-value pairs, wherein each key-value pair of the file system directory maps a respective object identifier to corresponding object metadata, wherein the respective object identifier identifies a respective file of a plurality of files stored to the data platform; detect an indication of a file system event for a file of the plurality of files; and in response to detecting the indication of the file system event: store, to a storage location of the key map, a key-value pair that maps an object identifier of the file to object metadata of the file; generate, based on the object identifier of the file, an indication of the storage location of the key map; include the indication of the storage location of the key map in the object metadata for the file, wherein the indication of the storage location of the key map is used to permit retrieval of the key-value pair that maps the object identifier of the file to the object metadata of the file using the object metadata for the file; and store the object metadata for the file to a data store.

In another example, this disclosure describes non-transitory computer-readable storage media comprising instructions that, when executed, cause processing circuitry of a computing system to store, at one or more of a plurality of storage locations of a key map, a file system directory including one or more key-value pairs, wherein each key-value pair of the file system directory maps a respective object identifier to corresponding object metadata, wherein the respective object identifier identifies a respective file of a plurality of files stored to the data platform; detect an indication of a file system event for a file of the plurality of files; and in response to detecting the indication of the file system event: store, to a storage location of the key map, a key-value pair that maps an object identifier of the file to object metadata of the file; generate, based on the object identifier of the file, an indication of the storage location of the key map; include the indication of the storage location of the key map in the object metadata for the file, wherein the indication of the storage location of the key map is used to permit retrieval of the key-value pair that maps the object identifier of the file to the object metadata of the file using the object metadata for the file; and store the object metadata for the file to a data store.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference characters denote like elements throughout the text and figures.

DETAILED DESCRIPTION

Figure 1A:
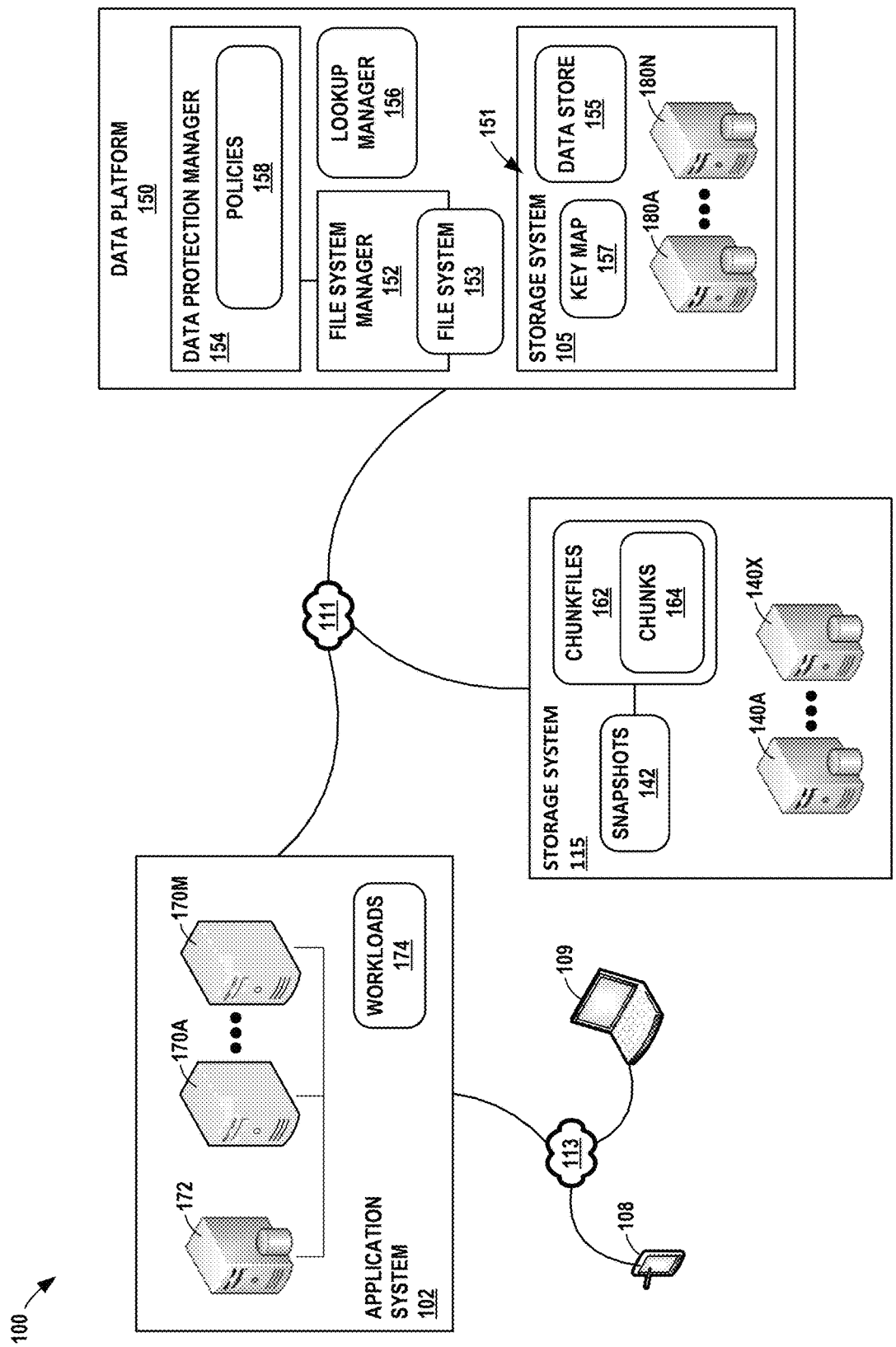
FIGS. 1A-1B are block diagrams illustrating example systems that perform efficient file system directory reverse name lookup, in accordance with techniques of this disclosure.
Figure 1B:
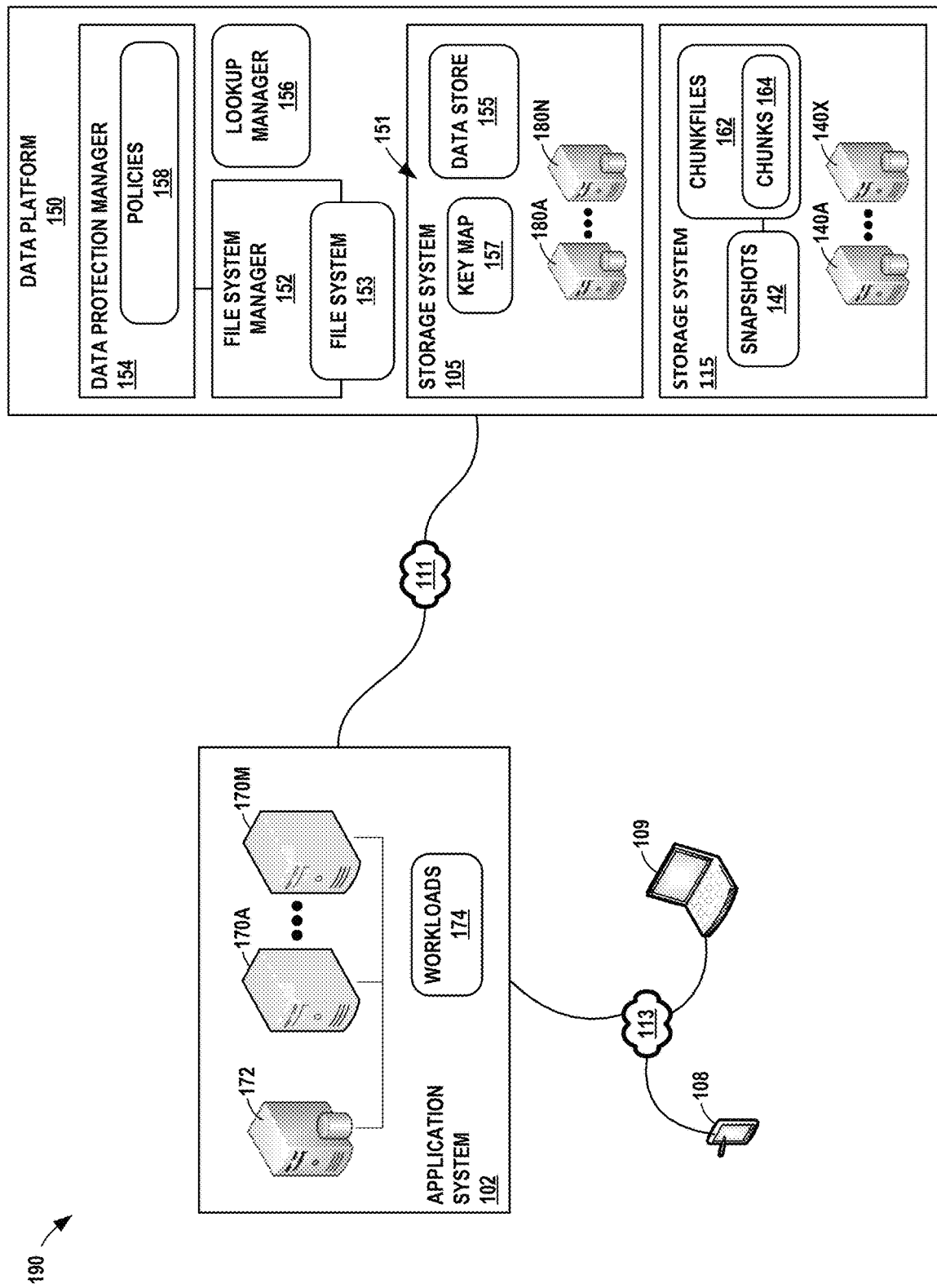

FIGS. 1A-1B are block diagrams illustrating example systems that perform efficient file system directory reverse name lookup, in accordance with one or more aspects of the present disclosure. In the example of FIG. 1A, system 100 includes application system 102. Application system 102 represents a collection of hardware devices, software components, and/or data stores that can be used to implement one or more applications or services provided to one or more mobile devices 108 and one or more client devices 109 via a network 113. Application system 102 may include one or more physical or virtual computing devices that execute workloads 174 for the applications or services. Workloads 174 may include one or more virtual machines, containers, Kubernetes pods each including one or more containers, bare metal processes, and/or other types of workloads.

In the example of FIG. 1A, application system 102 includes application servers 170A-170M (collectively, "application servers 170") that may include or be connected with a database server implementing a database. Other examples of application system 102 may include one or more load balancers, web servers, network devices such as switches or gateways, or other devices for implementing and delivering one or more applications or services to mobile devices 108 and client devices 109. Application system 102 may include one or more file servers. The one or more file servers may implement a primary file system for application system 102. (In such instances, file system 153 may be a secondary file system that provides snapshot, archive, and/or other services for the primary file system. Reference herein to a file system may include a primary file system or secondary file system, e.g., a primary file system for application system 102 or file system 153 operating as either a primary file system or a secondary file system.)

Application system 102 may be located on premises and/or in one or more data centers, with each data center being a part of a public, private, or hybrid cloud. The applications or services may be distributed applications. The applications or services may support enterprise software, financial software, office or other productivity software, data analysis software, customer relationship management, web services, educational software, database software, multimedia software, information technology, health care software, or other type of applications or services. The applications or services may be provided as a service (-aaS) for Software-aaS (SaaS), Platform-aaS (PaaS), Infrastructure-aaS (IaaS), Data Storage-aas (dSaaS), or other type of service.

In some examples, application system 102 may represent an enterprise system that includes one or more workstations in the form of desktop computers, laptop computers, mobile devices, enterprise servers, network devices, and other hardware to support enterprise applications. Enterprise applications may include enterprise software, financial software, office or other productivity software, data analysis software, customer relationship management, web services, educational software, database software, multimedia software, information technology, health care software, or other type of applications. Enterprise applications may be delivered as a service from external cloud service providers or other providers, executed natively on application system 102, or both.

In the example of FIG. 1A, system 100 includes a data platform 150 that may provide a file system 153 and snapshot functions to an application system 102, using storage system 105 and one or more separate storage systems 115. Data platform 150 implements a distributed file system 153 and a storage architecture to facilitate access by application system 102 to file system data and to facilitate the transfer of data between storage system 105 and application system 102 via network 111. With the distributed file system, data platform 150 enables devices of application system 102 to access file system data, via network 111 using a communication protocol, as if such file system data was stored locally (e.g., to a hard disk of a device of application system 102). Example communication protocols for accessing files and objects include Server Message Block (SMB), Network File System (NFS), or AMAZON Simple Storage Service (S3). File system 153 may be a primary file system or secondary file system for application system 102.

File system manager 152 represents a collection of hardware devices and software components that implements file system 153 for data platform 150. Examples of file system functions provided by the file system manager 152 include storage space management including deduplication, file naming, directory management, metadata management, partitioning, and access control. File system manager 152 executes a communication protocol to facilitate access via network 111 by application system 102 to files and objects stored to storage system 105.

Data platform 150 includes storage system 105 having one or more storage devices 180A-180N (collectively, "storage devices 180"). Storage devices 180 may represent one or more physical or virtual compute and/or storage devices that include or otherwise have access to storage media. Such storage media may include one or more of flash drives, solid state drives (SSDs), hard disk drives (HDDs), forms of electrically programmable memories (EPROM) or electrically erasable and programmable (EEPROM) memories, and/or other types of storage media used to support data platform 150. Different storage devices of storage devices 180 may have a different mix of types of storage media. Each of storage devices 180 may include system memory. Each of storage devices 180 may be a storage server, a network-attached storage (NAS) device, or may represent disk storage for a compute device. Storage system 105 may be a redundant array of independent disks (RAID) system. In some examples, one or more of storage devices 180 are both compute and storage devices that execute software for data platform 150, such as file system manager 152, data protection manager 154, and lookup manager 155 in the example of system 100, and store objects and metadata for data platform 150 to storage media. In some examples, separate compute devices (not shown) execute software for data platform 150, such as file system manager 152, data protection manager 154, and lookup manager 156 in the example of system 100. Each of storage devices 180 may be considered and referred to as a "storage node" or simply as a "node". Storage devices 180 may represent virtual machines running on a supported hypervisor, a cloud virtual machine, a physical rack server, or a compute model installed in a converged platform.

In various examples, data platform 150 runs on physical systems, virtually, or natively in the cloud. For instance, data platform 150 may be deployed as a physical cluster, a virtual cluster, or a cloud-based cluster running in a private, hybrid private/public, or public cloud deployed by a cloud service provider. In some examples of system 100, multiple instances of data platform 150 may be deployed, and file system 153 may be replicated among the various instances. In some cases, data platform 150 is a compute cluster that represents a single management domain. The number of storage devices 180 may be scaled to meet performance needs.

Data platform 150 may implement and offer multiple storage domains to one or more tenants or to segregate workloads 174 that require different data policies. A storage domain is a data policy domain that determines policies for deduplication, compression, encryption, and other operations performed with respect to objects stored using the storage domain. In this way, data platform 150 may offer users the flexibility to choose global data policies or workload specific data policies. Data platform 150 may support partitioning.

A view is a protocol export that resides within a storage domain. A view inherits data policies 158 from its storage domain, though additional policies 158 may be specified for the view. Views can be exported via SMB, NFS, S3, and/or another communication protocol. Policies 158 that determine data processing and storage by data platform 150 may be assigned at the view level. A policy may specify a snapshot frequency and a retention policy, which may include a data lock period. Snapshots 142 created in accordance with policy 158 inherit the data lock period and retention period specified by policy 158.

Each of network 113 and network 111 may be the Internet or may include or represent any public or private communications network or other network. For instance, network 113 may be a cellular, WI-FI, ZIGBEE, BLUETOOTH, Near-Field Communication (NFC), satellite, enterprise, service provider, and/or other type of network enabling transfer of data between computing systems, servers, computing devices, and/or storage devices. One or more of such devices may transmit and receive data, commands, control signals, and/or other information across network 113 or network 111 using any suitable communication techniques. Each of network 113 or network 111 may include one or more network hubs, network switches, network routers, satellite dishes, or any other network equipment. Such network devices or components may be operatively inter-coupled, thereby providing for the exchange of information between computers, devices, or other components (e.g., between one or more client devices or systems and one or more computer/server/storage devices or systems). Each of the devices or systems illustrated in FIGS. 1A-1B may be operatively coupled to network 113 and/or network 111 using one or more network links. The links coupling such devices or systems to network 113 and/or network 111 may be Ethernet, Asynchronous Transfer Mode (ATM) or other types of network connections, and such connections may be wireless and/or wired connections. One or more of the devices or systems illustrated in FIGS. 1A-1B or otherwise on network 113 and/or network 111 may be in a remote location relative to one or more other illustrated devices or systems.

Application system 102, using file system 153 provided by data platform 150, generates objects and other data that file system manager 152 creates, manages, and causes to be stored to storage system 105. For this reason, application system 102 may alternatively be referred to as a "source system," file system 153 for application system 102 may alternatively be referred to as a "source file system," and storage system 105 may alternatively be referred to as a "source storage system." Application system 102 may for some purposes communicate directly with storage system 105 via network 111 to transfer objects, and for some purposes communicate with file system manager 152 via network 111 to obtain objects or metadata indirectly from storage system 105. File system manager 152 generates and stores metadata to storage system 105. The collection of data stored to storage system 105 and used to implement file system 153 is referred to herein as file system data. File system data may include the aforementioned metadata and objects. Metadata may include file system objects, tables, trees, or other data structures; metadata generated to support deduplication; or metadata to support snapshots. Objects that are stored may include files, virtual machines, databases, applications, pods, container, any of workloads 174, system images, directory information, or other types of objects used by application system 102. Objects of different types and objects of a same type may be deduplicated with respect to one another.

Storage system 115 includes one or more storage devices 140A-140X (collectively, "storage devices 140"). Storage devices 140 may represent one or more physical or virtual compute and/or storage devices that include or otherwise have access to storage media. Such storage media may include one or more of Flash drives, solid state drives (SSDs), hard disk drives (HDDs), optical discs, forms of electrically programmable memories (EPROM) or electrically erasable and programmable (EEPROM) memories, and/or other types of storage media. Different storage devices of storage devices 140 may have a different mix of types of storage media. Each of storage devices 140 may include system memory. Each of storage devices 140 may be a storage server, a network-attached storage (NAS) device, or may represent disk storage for a compute device. Storage system 115 may include redundant array of independent disks (RAID) system. Storage system 115 may be capable of storing much larger amounts of data than storage system 105. Storage devices 140 may further be configured for long-term storage of information more suitable for archival purposes.

In some examples, storage system 105 and/or 115 may be a storage system deployed at and managed by a cloud storage provider and referred to as a "cloud storage system." Example cloud storage providers include, e.g., AMAZON WEB SERVICES (AWS) by AMAZON, INC., AZURE by MICROSOFT, INC., DROPBOX by DROPBOX, INC., ORACLE CLOUD by ORACLE, INC., and GOOGLE CLOUD PLATFORM (GCP) by GOOGLE, INC. In some examples, storage system 115 is co-located with storage system 105 in a data center, on-prem, or in a private, public, or hybrid private/public cloud. Where deployed and managed by a cloud storage provider, storage system 115 may be referred to as "cloud storage." Storage system 115 may include one or more interfaces for managing transfer of data between storage system 105 and storage system 115 and/or between application system 102 and storage system 115. Data platform 150 that supports application system 102 relies on storage system 105 to support latency sensitive applications. However, because storage system 105 is often more difficult or expensive to scale, data platform 150 may use storage system 115 to support use cases such as storing less frequently used data which may be for snapshots 142 or archives. In general, a file system snapshot is a copy of file system 153 to support protecting file system 153 for quick recovery and a file system archive ("archive") is a copy of file system 153 to support longer term retention and review. The "copy" of file system 153 may include such data as is needed to retrieve or view file system 153 in its state at the time of the snapshot or archive.

Data protection manager 154 may generate snapshot 142 of file system data for file system 153 at any time in accordance with policies 158 that specify, for example, snapshot periodicity and timing (daily, weekly, etc.), which file system data is to be stored, a snapshot retention period, storage location, access control, and so forth. An initial snapshot 142 of file system data corresponds to a state of the file system data at an initial snapshot time (the snapshot creation time of the initial snapshot). Initial snapshot 142 may include a full snapshot of the file system data or may include less than a full snapshot of the file system data, in accordance with policies 158. For example, the initial snapshot may include all objects of file system 153 or one or more selected objects of file system 153.

One or more subsequent incremental snapshots 142 of the file system 153 may correspond to respective states of the file system 153 at respective subsequent snapshot creation times, i.e., after the snapshot creation time corresponding to the initial snapshot. A subsequent snapshot 142 may include an incremental snapshot of file system 153. A subsequent snapshot may correspond to an incremental snapshot of one or more objects of file system 153. Some of the file system data for file system 153 stored on storage system 105 at the initial snapshot creation time may also be stored on storage system 105 at the subsequent snapshot creation times. A subsequent incremental snapshot may include data that was not previously stored to storage system 115. File system data that is included in a subsequent snapshot may be deduplicated by data protection manager 154 against file system data that is included in one or more previous snapshots, including the initial snapshot, to reduce the amount of storage used. (Reference to a "time" in this disclosure may refer to dates and/or times. Times may be associated with dates. Multiple snapshots may occur at different times on the same date, for instance.)

In system 100, data protection manager 154 archives file system data to storage system 115 as snapshots 142, using chunkfiles 162. Data protection manager 154 may use any of snapshots 142 to subsequently restore the file system (or portion thereof) to its state at the snapshot creation time, or the snapshot may be used to create or present a new file system (or "view") based on the snapshot, for instance. As noted above, data protection manager 154 may deduplicate file system data included in a subsequent snapshot against file system data that is included in one or more previous snapshots. For example, a second object of file system 153 and included in a second snapshot may be deduplicated against a first object of file system 153 and included in a first, earlier snapshot. Data protection manager 154 may remove a data chunk ("chunk") of the second object and generate metadata with a reference (e.g., a pointer) to a stored chunk of chunks 164 in one of chunkfiles 162. The stored chunk in this example is an instance of a chunk stored for the first object.

Data protection manager 154 may apply deduplication as part of a write process of writing (i.e., storing) an object of file system 153 to one of snapshots 142 in storage system 115. Deduplication may be implemented in various ways. For example, the approach may be fixed length or variable length, the block size for the file system may be fixed or variable, and deduplication domains may be applied globally or by workload. Fixed length deduplication involves delimiting data streams at fixed intervals. Variable length deduplication involves delimiting data streams at variable intervals to improve the ability to match data, regardless of the file system block size approach being used. This algorithm is more complex than a fixed length deduplication algorithm but can be more effective for most situations and generally produces less metadata. Variable length deduplication may include variable length, sliding window deduplication. The length of any deduplication operation (whether fixed length or variable length) determines the size of the chunk being deduplicated.

In some examples, the chunk size can be within a fixed range for variable length deduplication. For instance, data protection manager 154 can compute chunks having chunk sizes within the range of 16-48 KB. Data protection manager 154 may eschew deduplication for objects that that are less than 16 kB. In some example implementations, when data of an object is being considered for deduplication, data protection manager 154 compares a chunk identifier (ID) (e.g., a hash value of the entire chunk) of the data to existing chunk IDs for already stored chunks. If a match is found, data protection manager 154 updates metadata for the object to point to the matching, already stored chunk. If no matching chunk is found, data protection manager 154 writes the data of the object to storage as one of chunks 164 for one of chunkfiles 162. Data protection manager 154 additionally stores the chunk ID in chunk metadata, in association with the new stored chunk, to allow for future deduplication against the new stored chunk. In general, chunk metadata 232 is usable for generating, viewing, retrieving, or restoring objects stored as chunks 164 (and references thereto) within chunkfiles 162, for any of snapshots 142, and is described in further detail below.

Each of chunkfiles 162 includes multiple chunks 164. Chunkfiles 162 may be fixed size (e.g., 8 MB) or variable size. Chunkfiles 162 may be stored using a data structure offered by a cloud storage provider for storage system 115. For example, each of chunkfiles 162 may be one of an S3 object within an AWS cloud bucket, an object within AZURE Blob Storage, an object in Object Storage for ORACLE CLOUD, or other similar data structure used within another cloud storage provider storage system. Any of chunkfiles 162 may be subject to a write once, ready many (WORM) lock having a WORM lock expiration time.

The process of deduplication for multiple objects over multiple snapshots results in chunkfiles 162 that each have multiple chunks 164 for multiple different objects associated with the multiple snapshots. In some examples, different snapshots 142 may have objects that are effectively copies of the same data, e.g., for an object of the file system that has not been modified. An object of a snapshot may be represented or "stored" as metadata having references to chunks that enable the object of the snapshot to be accessed. Accordingly, description herein to a snapshot "storing," "having," or "including" an object includes instances in which the snapshot does not store the data for the object in its native form.

The initial snapshot and the one or more subsequent incremental snapshots of snapshots 142 may each be associated with a corresponding retention period and, in some cases, a data lock period for the snapshot. As described above, a data management policy (not shown) may specify a retention period for a snapshot and a data lock period for a snapshot. A retention period for a snapshot is the amount of time for which the snapshot and the chunks that objects of the snapshot reference are to be stored before the snapshot and the chunks are eligible to be removed from storage. The retention period for the snapshot begins when the snapshot is stored (the snapshot creation time). A chunkfile containing chunks that objects of a snapshot reference and that are subject to a retention period of the snapshot, but not subject to a data lock period for the snapshot, may be modified at any time prior to expiration of the retention period. The nature of such a modification must be such to preserve the data referenced by objects of the snapshot.

A user or application associated with application system 102 may have access (e.g., read or write) to data of snapshot 142 that is stored in storage system 115. The user or application may delete some of the data due to a malicious attack (e.g., virus, ransomware, etc.), a rogue or malicious administrator, and/or human error. The user's credentials may be compromised and as a result, snapshot 142 that is stored in storage system 115 may be subject to ransomware. To reduce the likelihood of accidental or malicious data deletion or corruption, a data lock having a data lock period may be applied to a snapshot.

As described above, chunkfiles 162 may represent an object in a storage system (shown as "storage system 115," which may also be referred to as "snapshot storage system 115") that conform to an underlying architecture of snapshot storage system 115. Data platform 150 includes data protection manager 154 that supports archiving of data in the form of chunkfiles 162, which interface with snapshot storage system 115 to store chunkfiles 162 after forming chunkfiles 162 from one or more chunks 164 of data. Data protection manager 154 may apply a process referred to as "deduplication" with respect to chunks 164 to remove redundant chunks and generate metadata linking redundant chunks to previously backed up chunks 164 and thereby reduce storage consumed (and thereby reduce storage costs in terms of storage required to store the chunks). Data protection manager 154 may aggregate chunks 164 with metadata to form chunkfile 162 at snapshot storage system 115.

As shown in the example of FIG. 1A, data platform 150 may include lookup manager 156. Lookup manager 156 may manage file system directory 151, which may include at least one key map 157 and at least one data store 155. For example, lookup manager 156 may access, create, update, and delete one or more entries (e.g., units of data) in key map 157, data store 155, or both. Lookup manager 156 may access (e.g., read) the entries in key map 157, data store 155, or both. Lookup manager 156 may manage file system directory 151 through storage system 105 or other suitable storage system or storage device. For example, lookup manager 156 may access, create, update, and delete one or more entries in key map 157, data store 155, or both with storage system 105, or another suitable storage system or storage device. In this manner, storage system 105 (or another suitable storage system or storage device) may represent a repository that stores data for key map 157, data store 155, or both.

In some examples, key map 157 may represent an index that may include individual values that are assigned to respective keys. In this manner, key map 157 may be used as an index for locating (e.g., finding, accessing) individual values by the respective keys. For example, key map 157 may include a set of key-value pairs where value data (e.g., data constituting each value) may be assigned to a respective key to allow the value data to be located through the respective key. Some examples of key map 157 may include arrays, dictionaries, tables, or other associative data structures capable of storing one or more sets of key-value pairs. Lookup manager 156 may manage key map 157 such that keys of key map 157 are sorted or otherwise arranged for efficient access. For example, lookup manager 156 may store individual keys of key map 157 such that the keys are sorted (e.g., numerically, alphanumerically) or arranged into a search tree (e.g., binary search tree, B+ tree) to allow individual keys to be efficiently found, such as through various search heuristics (e.g., binary search, depth first search, breadth first search).

Lookup manager 156 may use key map 157 to locate (e.g., find, access) a corresponding entry of value data using a key. For example, given a key, k, lookup manager 156 may search key map 157 to find a key-value pair having a key that matches key k. Lookup manager 156 may obtain the value for key k through such key-value pair. For example, the key-value pair may include the value data that constitutes the value assigned to key k by including an indication of the value (e.g., a pointer or reference to the data that constitutes the value). For instance, the key-value pair may include a value pointer that provides a reference the corresponding entry of value data. Lookup manager 156 may retrieve the value data using the value pointer. Because actual values (e.g., value data) of the key-value pairs may be very large (e.g., 1 megabyte (MB), 2 MB, 5 MB, or more), lookup manager 156 may store only the value pointer for each entry of value data (e.g., unit of value data) to key map 157 and store the value data to data store 155. In this manner, lookup manager 156 minimizes the memory usage by key map 157 and allows for efficient handling of large data sets by referencing value data through value pointers rather than storing value data directly within key map 157.

Lookup manager 156 may store value data to data store 155. For example, lookup manager 156 may store, in key map 157, value pointers or other references to respective entries of value data (e.g., corresponding units of value data) stored at data store 155. Lookup manager 156 may store the value data corresponding to individual value pointers to data store 155 and use the value pointers to locate respective entries of value data. Lookup manager 156 may store value data in the form of object metadata. In general, object metadata is usable for generating, viewing, retrieving, or restoring objects stored by data platform 150, such as objects stored within file system 153, including any snapshots 142 and chunkfiles 164 storing the objects within file system 153. Lookup manager 156 may generate and manage object metadata for structuring file system data 230 for file system 153. Object metadata may include tree data structures that describe objects within file system 153 and the hierarchy (e.g., directory structure) of file system 153, and can be used to write or retrieve objects within file system 153. In some examples, object metadata may be an example of chunk metadata.

Some examples of object metadata include metadata for files or other objects of file system 153, or other file system related metadata. For instance, object metadata may represent inode or similar information (e.g., master file table information on non-UNIX systems) including metadata about corresponding files or other objects of file system 153 such as the size (e.g., bytes), access permissions (e.g., read, write, read/write), owner identifier (e.g., user ID), group identifier (e.g., group ID), storage location (e.g., indication of the storage device storing the object), one or more timestamps (e.g., creation and/or modification times), link count (e.g., hard/soft link count), and file type of the object, or various subsets thereof. Object metadata may include unique identifiers (e.g., inode numbers or inode identifiers (IDs)) that may uniquely identify individual files or other objects of file system 153. In some examples, object metadata may form a tree data structure in that individual entries of object metadata may include a pointer or references to one or more other entries of object metadata. For instance, a first entry of object metadata corresponding to an object (e.g., file) may include an indication (e.g., pointer) of a second entry of object metadata corresponding to the immediate parent directory of the object and the second entry of object metadata may include an indication of a third entry of object metadata corresponding to the parent directory of the immediate parent directory, and so and so forth through to a root directory (e.g., the root file system path) of file system 153.

As described above, lookup manager 156 may implement key map 157 using an associative data structure. In some examples, lookup manager 156 may implement key map 157 as a hashmap, which may include keys, such as in the form of strings (e.g., one or more numeric, alphanumeric, or other characters). Lookup manager 156 may apply a hash function to each key to generate a hash, which may be referred to as a key hash. As such, lookup manager 156 may convert the key to a corresponding key hash by applying the hash function. Lookup manager 156 may use the key hash to determine an index, fragment, bucket, or other storage location within key map 157 where lookup manager 156 may locate the corresponding key-value pair and/or store the corresponding key-value pair in key map 157. For example, lookup manager 156 may distribute keys into buckets of key map 157 by applying the hash function, whereby individual keys are assigned to particular buckets based on their respective key hashes. For instance, lookup manager 156 may apply the hash function to generate a key hash that identifies the bucket the key is or should be assigned to. To locate a key-value pair, lookup manager 156 may locate the key-value pair having the key within the identified bucket, such as by performing a search function through one or more key-value pairs in the identified bucket. To store a key-value pair, lookup manager 156 may store the key-value pair such that the key-value pair is assigned to the identified bucket.

The hash function may be selected to ensure that the keys are evenly distributed across multiple buckets (e.g., multiplicative hashing functions, universal hashing functions, division method hashing functions). Application of the hash function by lookup manager 156 ensures efficient data retrieval and storage, such as by minimizing collisions and distributing keys evenly across the available buckets of key map 157. By using strings as keys, lookup manager 156 may provide flexible and human-readable keys.

In some examples, lookup manager 156 may implement key map 157 as a bidirectional associative data structure, such as a bidirectional hashmap, whereby each key-value pair has a one-to-one correspondence, allowing both keys and value data to be used interchangeably for lookups. For example, with such a one-to-one correspondence, given a key, k, the corresponding value, v, can be found in the bidirectional hashmap and given the value, v, the corresponding key, k, can be found through the bidirectional hashmap. In some bidirectional hashmaps, although forward lookups (e.g., key-to-value) are efficient due to the direct mapping of keys to their respective buckets, reverse lookups (value-to-key) may be inefficient. The inefficiency may arise because reverse lookups may require a traversal (e.g., loop) through all buckets and/or key-value pairs to locate the specific key-value pair associated with the given value. Such traversal leads to increased computational overhead (e.g., higher processor utilization) and slower retrieval times (e.g., higher latency).

In accordance with the described techniques, lookup manager 156 may store an indication of a storage location (e.g., bucket) of key map 157 within the corresponding value data of the key-value pair. For example, lookup manager 156 may embed the key hash of a key of a key-value pair within the value data corresponding to the key-value pair. The embedded indication, in this example the key hash, may significantly enhance the efficiency (e.g., reduce retrieval time/latency) of locating the storage location (e.g., bucket), in key map 157, where the key-value pair is stored. As described above, the key hash of the key may represent an indication of the corresponding storage location in key map 157 that contains the key-value pair with the key. The key hash may accordingly represent a unique identifier that maps directly to or otherwise identifies a particular storage location of key map 157. As such, by embedding the key hash of a key within the corresponding value data, lookup manager 156 may, using a key hash from an entry of value data, quickly determine which storage location the key-value pair is stored at without traversing the entirety of key map 157 (e.g., traversing each bucket and/or key of key map 157).

In this manner, lookup manager 156 provides a more direct and streamlined lookup process with shorter retrieval times. Lookup manager 156 accordingly reduces computational overhead substantially and improves the performance of reverse lookups by eliminating (e.g., not performing) exhaustive traversals across all buckets and/or keys when locating a desired key-value pair. In some examples, the complexity of a reverse lookup may be reduced by the described techniques from a linear running time or, such as may be denoted as $O(n)$ in Big O notation, to a constant running time, such as may be denoted as $O(1)$ in Big O notation, where n is the number of storage locations (e.g., buckets, fragments) of key map 157. In some systems, there may be a limit to the number of key-value pairs 257 per storage location (e.g. 4000 key-value pairs per bucket). In these systems, the described techniques may reduce the complexity of reverse lookups from $O(n)$ to $O(1)$ where n may be the number of storage locations.

Lookup manager 156 may truncate the key hash prior to storing the key hash within the value data of a key-value pair. In this manner, lookup manager 156 stores a truncated key hash within the value data, which may be sufficient to identify the corresponding storage location of key map 157 while conserving storage space. For example, lookup manager 156 may store a portion, such as particular bytes of the key hash within the value data. For instance, lookup manager 156 may store the least significant n bytes (e.g., 4, 6, 8 bytes) of a key hash within the value data.

In operation, lookup manager 156 may store one or more first key-value pairs to a single storage location of key map 157. For example, upon initialization (e.g., during initial use) key map 157 may only contain a single bucket. To manage the distribution of one or more additional key-value pairs efficiently, lookup manager 156 may include a bucket size threshold. Lookup manager 156 may use the bucket size threshold to determine when a bucket configuration (e.g., the number of buckets) should be adjusted. For example, lookup manager 156 may determine whether the ratio of total key-value pairs across all buckets to the number of buckets satisfies (e.g., exceeds) the bucket size threshold and adjust the number of buckets based on whether the bucket size threshold is satisfied. For instance, in response to the ratio exceeding the bucket size threshold, lookup manager 156 may increase the number of buckets, such as by doubling the number of buckets, to better distribute the key-value pairs. The better distribution allows lookup manager 156 to maintain a desired level of performance (e.g., amount of latency) when managing (e.g., accessing, updating, etc.) key map 157. If the ratio falls below the threshold, lookup manager 156 may decrease the number of buckets, such as by halving the number of buckets. In this manner, lookup manager 156 may optimize (e.g., reduce) resource usage and maintains efficiency in managing key map 157. By dynamically resizing buckets of key map 157 in this manner, lookup manager 156 may balance the storage of key-value pairs across buckets and ensure efficient storage and retrieval operations (e.g., management operations) relative to key map 157.

Data platform 150 may may use lookup manager 156 and key map 157 to efficiently manage elements (e.g., objects) of distributed or other file systems, such as file system 153. For example, data protection manager 154 and/or file system manager 152 of data platform 150 may invoke lookup manager 156 to store mappings of object names to object identifiers (e.g., store key-value pairs at key map 157) and vice versa (e.g., store indications of storage locations at data store 155). As such, object names may correspond to keys of the key-value pairs and object identifiers may correspond to value pointers of the key-value pairs. Object identifiers may be any suitable identifier of an object. For example, an object identifier may be an inode ID or other unique identifier of an object of file system 153.

Examples of object names may include names or other identifiers of files or objects of file system 153, such as filenames and directory names. Such names may, in some examples, include a file system path (e.g., /usr/etc/filename.txt) or a portion thereof. Elements of a file system path (e.g., directories, subdirectories, files) may be delineated by a "/" or other separator. As such, an object name may include a portion of a file system path as delineated by such a separator. For example, an object name for a file named "filename.txt" may include the full file system path of the file (e.g., /usr/local/filename.txt) or a last or other portion or element thereof (e.g., filename.txt). As another example, an object name for a directory named "local" may represent the full file system path of the directory (e.g., /usr/local) or a last or other portion thereof (e.g., local). The object name may represent only the name of the object. For example, the object name for the object filename.txt may be "filename.txt" and the object name for the directory local may be "local."

Key map 157 may map object names to object identifiers in a bidirectional fashion (e.g., with a one-to-one correspondence) to facilitate forward lookups (e.g., key-to-value) and reverse lookups (e.g., value-to-key). For example, lookup manager 156 may store, in key map 157, key-value pairs corresponding to object names and object identifiers, where the object names constitute the keys of the key-value pairs and the object identifiers correspond to the values of the key-value pairs. For instance, the "values" of the key-value pairs of key map 157 may be value pointers that each reference a respective entry of object metadata (e.g., value data) at data store 155 where individual object identifiers may be stored in the respective entries of object metadata at data store 155. As such, lookup manager 156 may retrieve individual object identifiers from respective entries of object metadata stored at data store 155.

In some examples, lookup manager 156 may use object identifiers as a value pointers to respective entries of value data at data store 155. As such, an object identifier may identify the object of file system 153, an entry of object metadata at data store 155, or both. For example, an object identifier in the form of an inode ID for an object, may identify the object at file system 153 and constitute a value pointer to the entry of object metadata at data store 155 for the object. As described above, the object metadata may include various metadata about a file or other object, which may include an object identifier (e.g., inode ID). In examples where lookup manager 156 uses object identifiers as value pointers, to retrieve an object identifier lookup manager 156 may retrieve a value pointer from the corresponding key-value pair of key map 157 rather than from an entry of object metadata of data store 155.

Lookup manager 156 may implement key map 157 as a bidirectional data structure to allow forward lookups where object identifiers (and other object metadata) may be retrieved by object names, and reverse lookups where object names may be retrieved by object identifiers. To perform a forward lookup, lookup manager 156 may access an object identifier by the object name of the object using key map 157. For example, lookup manager 156 may find the key-value pair in key map 157 having a key that matches the object name, such as by executing one or more search heuristics. Lookup manager 156 may retrieve the object identifier based on the key-value pair. For example, the key-value pair may include the object identifier as a value pointer or the key-value pair may include a value pointer (that is distinct from the object identifier) that references an entry of object metadata, at data store 155, that stores the object identifier.

In the former case, the object identifier is used as a value pointer and lookup manager 156 may accordingly retrieve the object identifier directly from the key-value pair of key map 157. Lookup manager 156 may use the object identifier to retrieve a corresponding entry of object metadata at data store 155. In the latter case, lookup manager 156 may identify the corresponding entry of object metadata at data store 155 using the key-value pair of key map 157 through the value pointer of the key-value pair. Lookup manager 156 may retrieve the object metadata for the object using the value pointer. In this latter case, the object metadata may contain the object identifier. As such, lookup manager 156 may retrieve the object identifier from the object metadata.

To perform a reverse lookup, lookup manager 156 may retrieve an object name for the object by the object identifier for the object using key map 157. As described above, lookup manager 156 may include, in an entry of object metadata for the object stored at data store 155, a key hash or other indication of the storage location (e.g., bucket, index) where the key-value pair corresponding to the key is stored in key map 157. For example, lookup manager 156 may search data store 155 for an entry of object metadata assigned to or including the object identifier. Lookup manager 156 may retrieve the key hash from such entry of object metadata and use the key hash to locate the storage location (e.g., bucket) where the corresponding key-value pair is stored in key map 157. Lookup manager 156 may locate the key-value pair from such storage location. As described above, key-value pairs may use object names as keys. As such, lookup manager 156 may obtain the object name by reading the key of the corresponding key-value pair.

In some examples, data store 155 may include an index that lookup manager 156 may use to efficiently locate individual entries of object metadata in data store 154 using respective object identifiers. Such index may map object identifiers to respective entries of object metadata within data store 155. Lookup manager 156 may manage the index of data store 155, such that object identifiers are sorted or otherwise arranged for efficient access. For example, lookup manager 156 may store individual object identifiers such that the object identifiers are sorted (e.g., numerically, alphanumerically) or arranged into a search tree (e.g., binary search tree, B+ tree) to allow individual object identifiers to be efficiently found, such as through various search heuristics (e.g., binary search, depth first search, breadth first search). In this manner, given an object identifier, lookup manager 156 may efficiently search data store 155 for the entry of object metadata assigned to the object identifier and retrieve the entry of object metadata. As described above, lookup manager 156 may then use a key hash from an entry of object metadata to locate the corresponding key-value pair in key map 157.

System 190 of FIG. 1B is a variation of system 100 of FIG. 1A in that data platform 150 stores snapshots 142 using chunkfiles 162 stored to storage system 115 that is on premises or local to data platform 150. In some examples of system 190, storage system 115 enables users or applications to create, modify, or delete objects, snapshots 142, or both via file system manager 152. In system 190, storage system 105 of FIG. 1B may be the local storage system used by data protection manager 154 for initially storing and accumulating objects prior to storing objects (e.g., backing up objects) to storage system 115. Data protection manager 154 may store objects as data chunks at storage system 105, storage system 115, or both regardless of whether or not storage system 105 is remote or local to data platform 150.

Although some techniques described in this disclosure are described with respect to a snapshot function performed by a data protection manager of a data platform, similar techniques may additionally or alternatively be applied for an archive, replica, clone, or backup function performed by the data platform. In such cases, snapshots 142 would be archives, replicas, clones, or backups, respectively.

Figure 2:
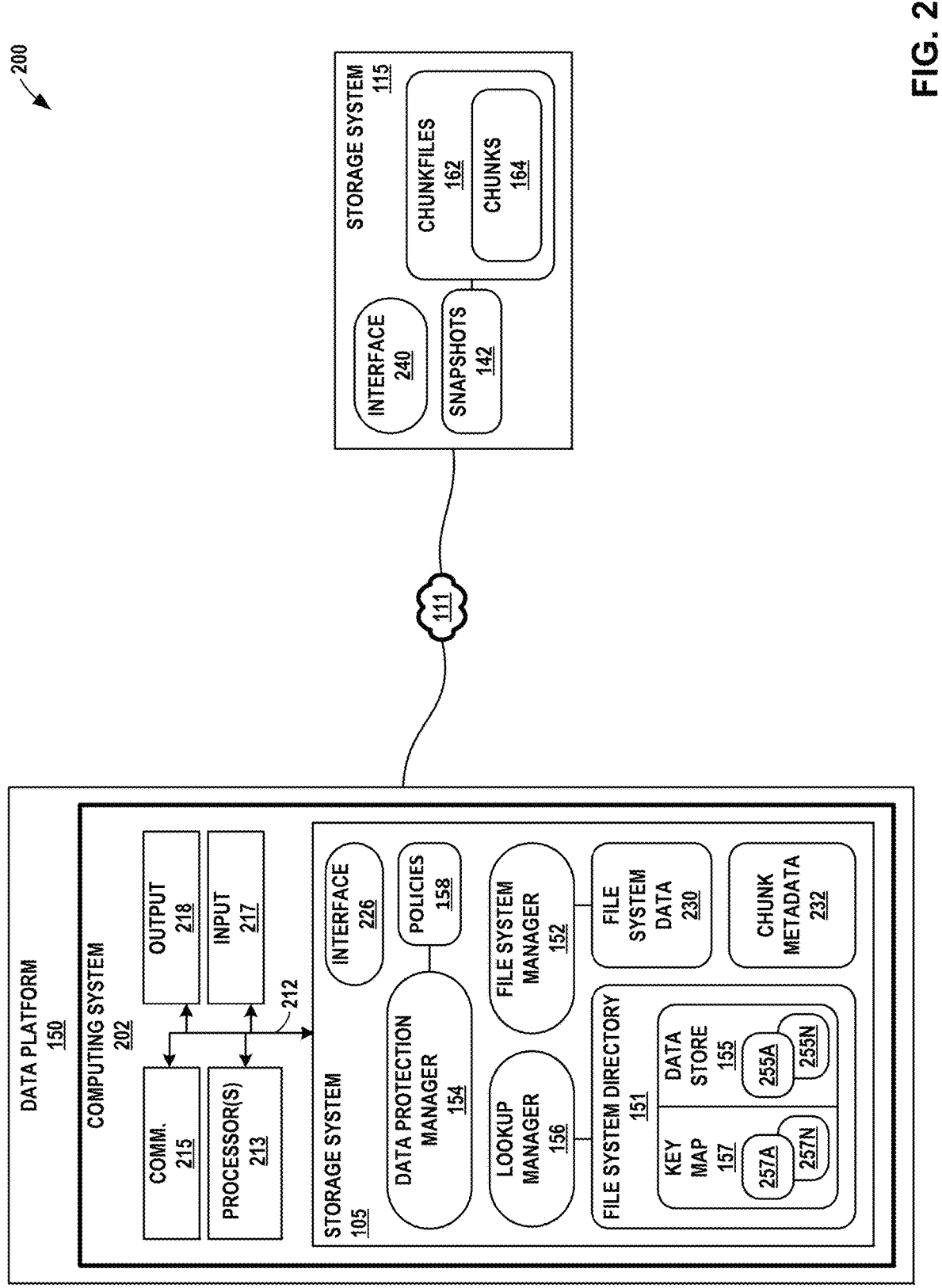
FIG. 2 is a block diagram illustrating an example system that performs efficient file system directory reverse name lookup, in accordance with techniques of this disclosure.

FIG. 2 is a block diagram illustrating example system 200, in accordance with techniques of this disclosure. System 200 of FIG. 2 may be described as an example or alternate implementation of system 100 of FIG. 1A or system 190 of FIG. 1B (where objects are written to a local snapshot storage system 115). Data protection manager 154 may store chunk metadata 232 including references (e.g., pointers) to portions of objects (e.g., chunks 164) at local snapshot storage system 115, as will be described further below. One or more aspects of FIG. 2 may be described herein within the context of FIG. 1A and FIG. 1B.

In the example of FIG. 2, system 200 includes network 111, data platform 150 implemented by computing system 202, and storage system 115. Although only one storage system 115 is depicted, data platform 150 may apply techniques in accordance with this disclosure using multiple instances of snapshot storage system 115. The different instances of storage system 115 may be deployed by different cloud storage providers, the same cloud storage provider, by an enterprise, or by other entities.

Computing system 202 may be implemented as any suitable computing system, such as one or more server computers, workstations, mainframes, appliances, cloud computing systems, and/or other computing systems that may be capable of performing operations and/or functions described in accordance with one or more aspects of the present disclosure. In some examples, computing system 202 represents a cloud computing system, server farm, and/or server cluster (or portion thereof) that provides services to other devices or systems. In other examples, computing system 202 may represent or be implemented through one or more virtualized compute instances (e.g., virtual machines, containers) of a cloud computing system, server farm, data center, and/or server cluster.

In the example of FIG. 2, computing system 202 may include one or more communication units 215, one or more input devices 217, one or more output devices 218, and one or more storage devices of local storage system 105. Local storage system 105 may include interface module 226, file system manager 152, and policies 158 as well as data protection manager 154 and lookup manager 156. One or more of the devices, modules, storage areas, or other components of computing system 202 may be interconnected to enable inter-component communications (physically, communicatively, and/or operatively). In some examples, such connectivity may be provided through communication channels (e.g., communication channels 212), which may represent one or more of a system bus, a network connection, an inter-process communication data structure, or any other method for communicating data.

Data platform 150 may include lookup manager 156, which may be stored to storage system 105. One or more modules of data platform 150 (e.g., data protection manager 154, file system manager 152) may, through lookup manager 156, manage file system directory 151 and use file system directory 151 for generating, viewing, retrieving, or restoring objects stored by data platform 150, such as objects stored within file system 153, including any snapshots 142 and chunkfiles 164 storing the objects within file system 153. File system metadata 151 may include key map 157 and data store 155. Key map 157 may include a plurality of key-value pairs 257A-257N (collectively, "key-value pairs 257"). Data store 155 may include a plurality of entries of object metadata 255A-255N (collectively, "object metadata 255") or other value data.

As described above, lookup manager 156 may use key map 157 as an index for locating object metadata 255 stored by data store 155. Lookup manager 156 may use key map 157 as an index for efficiently performing forward lookups (e.g., key-to-value). For example, key map 157 may include one or more key-value pairs 257 with keys corresponding to object names that map to value pointers to respective entries of object metadata 255 at data store 155. Lookup manager 156 may locate an entry of object metadata 255A through an object name through the key-value pair 257A with a key matching the object name.

Lookup manager 156 may store, to data store 155, an indication of a storage location (e.g., bucket) of key map 157 within a corresponding object metadata 255 to allow lookup manager 156 to efficiently perform reverse lookups (e.g., value-to-key). For example, lookup manager 156 may embed a key hash of the key of key-value pair 257A within entry of object metadata 255A. The embedded key hash, may significantly enhance the efficiency (e.g., reduce retrieval time/latency) of locating key-value pair 257A in key map 157. As described above, the key hash of the key may represent an indication of the bucket within key map 157 that contains the key. The key hash may accordingly represent a unique identifier that maps directly to or otherwise identifies a particular storage location of key map 157 where key-value pair 257A may be located. As such, by embedding the key hash of a key within entry of object metadata 255A, lookup manager 156 may, using the key hash, quickly determine the storage location of key-value pair 257A without traversing the entirety of key map 157 (e.g., traversing each bucket and/or key of key map 157). Lookup manager 156 may retrieve key-value pair 257 based on the location thereof, such as to obtain the key, which constitutes the object name.

Data platform 150 may use reverse lookups during basic file system operations, such as viewing files. In addition or alternatively, data platform 150, may use reverse lookups when performing operations on file system 153, snapshots 142, chunkfiles 162, or other collections of objects where object identifiers are provided or otherwise available to a module of data platform 150. For example, data protection manager 154 may receive an object identifier in the form of an inode ID corresponding to an object that has been changed since a previous snapshot 142. Data protection manager 154 may invoke lookup manager 156 with such object identifier as input. Lookup manager 156 may perform a reverse lookup to determine the object name for the object using the object identifier. For example, lookup manager 156 may locate an entry of object metadata 255A at data store 155 that is assigned to the object identifier. Lookup manager 156 may read entry of object metadata 255A to obtain an indication of the storage location (e.g., key hash) that identifies the location of key-value pair 257A in key map 157. Lookup manager 156 may locate key-value pair 257A using such indication and read the key from key-value pair 257A. As described above, such key may be the object name for the object, which may correspond to a portion of the file system path (e.g., directory) in the hierarchy of file system 153. Data platform 150 may use the object name to construct a file system path for the object, such as to perform inode or object level operations (e.g., garbage collection, data replication) relative to the object.

To illustrate, file system manager 152 may use object names obtained from reverse lookups to identify orphaned inodes, such as for garbage collection purposes. During object (e.g., file) creation file system manager 152 may create an inode and a corresponding entry in a directory hashmap (e.g., key map 157). If an error occurs subsequent to creating the inode and before the directory entry is created, the inode may constitute an orphaned inode. To determine whether an inode is an orphaned inode, file system manager 152 may determine whether the inode ID for the inode is referenced by a directory entry (e.g., is referenced by a parent directory). For example, file system manager 152 may invoke lookup manager 156 using the inode ID as input. Lookup manager 156 may locate an entry of object metadata 255A at data store 155 that is assigned to or includes an object identifier that matches the inode ID. Lookup manager 156 may locate key-value pair 257A in key map 157 using a key hash or other storage location identifier in object metadata 255A. Lookup manager 156 may obtain the key from key-value pair 257A and such key may be the object name for the inode. As described above, the object name may include a file system path (e.g., directory path) or a portion thereof. As such, file system manager 152 may use the object name to identify the parent directory of inode. For example, lookup manager 156 may perform one or more reverse lookups to construct the full file system path through to a root of the file system (e.g., "/"). File system manager 152 may search the directory hashmap to determine whether a directory entry for the parent directory includes a pointer or other reference to the inode. If such directory entry does not include a reference to the inode, file system manager 152 may determine the inode is an orphan inode and perform garbage collection on the inode (e.g., delete the inode) to conserve storage space, such as at storage system 105, storage system 115, or both.

As another illustration, data protection manager 154 may use reverse lookups during data replication. For instance, data protection manager 154 may use reverse lookups to perform logical replication of snapshots 142. As compared to byte level physical replication (e.g., replication by replication of individual bytes), data protection manager 154 may perform logical replication at an object (e.g., file) level, such as by replicating individual objects. In some examples, data protection manager 154 may receive inode IDs or other object identifiers that correspond to objects that have changed between snapshots 142. Data protection manager 154 may invoke lookup manager 156 with an inode ID for a changed object as input to perform a reverse lookup based on the inode ID. Lookup manager 156 may locate an entry of object metadata 255A at data store 155 that is assigned to or includes an object identifier that matches the inode ID. Lookup manager 156 may locate key-value pair 257A in key map 157 using a key hash or other storage location identifier in object metadata 255A. Lookup manager 156 may obtain the key from key-value pair 257A and such key may be the object name for the object. As described above, the object name may include at least a portion of the file system path for the object. Lookup manager 156 may perform one or more reverse lookups to construct the full file system path through to a root of the file system (e.g., "/"). Data protection manager 154 may then identify the object for replication using the full file system path and perform logical replication on the object (e.g., copy the object).

In some examples, lookup manager 156 may perform reverse lookups recursively, such as to construct the full file system path. To illustrate, given an inode ID for an object named "filename.txt" stored at the file system path "/usr/local/filename.txt," lookup manager 156 may recursively perform reverse lookups beginning with the inode ID for the object. For instance, lookup manager 156 may recursively traverse object metadata 255 for and related to the object and perform a reverse lookup for a respective object name at the individual steps of such traversal (e.g., for each entry of object metadata 255). As described above, object metadata 255 may form a tree data structure in that individual entries of object metadata may include a pointer or references to one or more other entries of object metadata. For example, individual entries of object metadata 255 may include an inode ID that points to a parent object (e.g., parent directory). As such, lookup manager 156 may recursively traverse object metadata beginning at entry of object metadata 255A for the object (e.g., filename.txt) and continuing through the directory structure until the file system root (e.g., "/") is reached. Lookup manager 156 may determine the file system root is reached when the corresponding entry of object metadata 255 does not include an inode ID to a parent directory.

In the above example for instance, lookup manager 156 may obtain an inode ID for the parent directory of "filename.txt" from entry of object metadata 255A for "filename.txt." Lookup manager 156 may perform a reverse lookup with the inode ID of the parent directory to determine the object name for the parent directory, which is "local" in this example. Similarly, lookup manager 156 may obtain an inode ID for the parent directory of "local" from the entry of object metadata for "local." Lookup manager 156 may perform a reverse lookup with the inode ID for the parent directory of "local" to determine the object name for the parent directory, which is "usr" in this example. Lookup manager 156 may perform another reverse lookup to determine the object name for the parent directory of "usr," which is "/" in this example. Lookup manager 156 may determine "/" is the file system root in that the entry of object metadata for "/" does not include an inode ID to another parent directory. Lookup manager 156 may combine each object name determined from one or more reverse lookups to construct the full file system path. Continuing the above example for instance, lookup manager 156 may concatenate each object name obtained during the traversal of the entries of object metadata 255 for and related to "filename.txt" to construct the full file system path of "/usr/local/filename.txt."

Data protection manager 154 may perform data replication between individual storage systems or storage devices. Referring to FIG. 1A for example, data protection manager 154 may perform logical replication between a first storage node 180A and a second storage node 180N, a first storage device 140A and a second storage device 140X, or both. For instance, first storage device 140A may send one or more inode IDs for objects stored by first storage device 140A that have changed. Objects may change due to user or other activity at a source system, such as application system 102. For example, users may run one or more workloads 174 that modify objects, such as to update, remove, or add data to the objects.

Lookup manager 156 may perform one or more reverse lookups (e.g., recursive reverse lookups) on these inode IDs to identify the full file system paths for the objects that have changed. Second storage device 140X may synchronize corresponding objects stored by second storage device 140X with the changed objects stored by first storage device 140A, which may be identified with the respective full file system paths. For example, second storage 140X may rewrite, overwrite, or otherwise update the corresponding objects to include data from the changed objects such that the corresponding objects respectively match each of the changed objects (e.g., are converted to replicas or copies of the changed objects). Second storage device 140X may synchronize the object metadata for the corresponding objects. Though described with respect to storage devices 140, other storage devices or systems, such as first storage node 180A and second storage node 180N may respectively operate similarly to first storage device 140A and second storage device 140X to perform data replication as described above.

As can be seen, various elements of data platform 150 may include and/or perform the functions of lookup manager 156 as described herein. For example, alternatively to or in addition to data protection manager 154, file system manager 152 may include and/or invoke lookup manager 156 to perform forward lookups, reverse lookups, or both. By storing indications of storage locations of key map 157 in object metadata 255, lookup manager 156 may quickly determine the location of the key-value pair 257A in key map 157 without exhaustively traversing (e.g., traversing in a brute force manner) the entirety of key map 157. In this manner, lookup manager 156 provides more direct and streamlined reverse lookups with shorter retrieval times. Lookup manager 156 accordingly reduces computational overhead and improves the performance of reverse lookups.

One or more processors 213 of computing system 202 may implement functionality and/or execute instructions associated with computing system 202 or associated with one or more modules illustrated in FIG. 2 and described below. One or more processors 213 may be, may be part of, and/or may include processing circuitry that performs operations in accordance with one or more aspects of the present disclosure. Examples of processors 213 include microprocessors, application processors, display controllers, auxiliary processors, one or more sensor hubs, and any other hardware configured to function as a processor, a processing unit, or a processing device. Computing system 202 may use one or more processors 213 to perform operations in accordance with one or more aspects of the present disclosure using software, hardware, firmware, or a mixture of hardware, software, and firmware residing in and/or executing at computing system 202.

One or more communication units 215 of computing system 202 may communicate with devices external to computing system 202 by transmitting and/or receiving data, and may operate, in some respects, as both an input device and an output device. In some examples, communication units 215 may communicate with other devices over a network. In other examples, communication units 215 may send and/or receive radio signals on a radio network such as a cellular radio network. In other examples, communication units 215 of computing system 202 may transmit and/or receive satellite signals on a satellite network. Examples of communication units 215 include a network interface card (e.g., such as an Ethernet card), an optical transceiver, a radio frequency transceiver, a GPS receiver, or any other type of device that can send and/or receive information. Other examples of communication units 215 may include devices capable of communicating over BLUETOOTH, GPS, NFC, ZIGBEE, and cellular networks (e.g., 3G, 4G, 5G), and WI-FI radios found in mobile devices as well as Universal Serial Bus (USB) controllers and the like. Such communications may adhere to, implement, or abide by appropriate protocols, including Transmission Control Protocol/Internet Protocol (TCP/IP), Ethernet, BLUETOOTH, NFC, or other technologies or protocols.

One or more input devices 217 may represent any input devices of computing system 202 not otherwise separately described herein. Input devices 217 may generate, receive, and/or process input. For example, one or more input devices 217 may generate or receive input from a network, a user input device, or any other type of device for detecting input from a human or machine.

One or more output devices 218 may represent any output devices of computing system 202 not otherwise separately described herein. Output devices 218 may generate, present, and/or process output. For example, one or more output devices 218 may generate, present, and/or process output in any form. Output devices 218 may include one or more USB interfaces, video and/or audio output interfaces, or any other type of device capable of generating tactile, audio, visual, video, electrical, or other output. Some devices may serve as both input and output devices. For example, a communication device may both send and receive data to and from other systems or devices over a network.

One or more storage devices of local storage system 105 within computing system 202 may store information for processing during operation of computing system 202, such as random access memory (RAM), Flash memory, solid-state disks (SSDs), hard disk drives (HDDs), etc. Storage devices may store program instructions and/or data associated with one or more of the modules described in accordance with one or more aspects of this disclosure. One or more processors 213 and one or more storage devices may provide an operating environment or platform for such modules, which may be implemented as software, but may in some examples include any combination of hardware, firmware, and software. One or more processors 213 may execute instructions and one or more storage devices of storage system 105 may store instructions and/or data of one or more modules. The combination of processors 213 and local storage system 105 may retrieve, store, and/or execute the instructions and/or data of one or more applications, modules, or software. Processors 213 and/or storage devices of local storage system 105 may also be operably coupled to one or more other software and/or hardware components, including, but not limited to, one or more of the components of computing system 202 and/or one or more devices or systems illustrated as being connected to computing system 202.

File system manager 152 may perform functions relating to providing file system 153, as described above with respect to FIG. 1A. File system manager 152 may generate and manage chunk metadata 232 for structuring file system data 230 for file system 153, and store chunk metadata 232 and file system data 230 to local storage system 105. Chunk metadata 232 may include tree data structures that describe objects within file system 153 and the hierarchy of file system 153, and can be used to write or retrieve objects within file system 153. File system manager 152 may interact with and/or operate in conjunction with one or more modules of computing system 202, including interface module 226 and data protection manager 154.

Data protection manager 154 may deduplicate file system data included in a snapshot 142 against file system data that is included in one or more previous snapshots. For example, a second object of file system 153 and included in a second snapshot 142 may be deduplicated against a first object of file system 153 and included in a first, earlier snapshot 142. Data protection manager 154 may remove a chunk 164 of the second object and generate chunk metadata 232 with a reference (e.g., a pointer) to a stored chunk of chunks 164 in one of chunkfiles 162. Stored chunk 164 in this example is an instance of a chunk stored for the first object. In some examples, deduplication may only occur between a subset of snapshots 142, for example snapshots 142 stored on a particular storage service 115, such to allow independent snapshots to exist, or to confirm to one or more policies 158.

Data protection manager 154 may generate one or more snapshots and cause file system data 230 to be stored in a tree data structure and chunks 164 within chunkfiles 162 in storage system 115. Data protection manager 154 may apply a deduplication process to selectively deduplicate chunks of objects within file system data 230, in accordance with one or more policies 158. Data protection manager 154 may generate and manage the tree data structure for generating, viewing, retrieving, or restoring any of objects. Data protection manager 154 may generate and manage the tree data structure for generating, viewing, retrieving, or restoring objects stored as chunks 164 (and references thereto) within chunkfiles 162. Stored objects may be represented and manipulated using logical files for identifying chunks 164 for the objects.

Local storage system 105 may store a chunk table, which may be a part of chunk metadata 232, that describes chunks 164. The chunk table may include respective chunk IDs for chunks 164 and may contain pointers to chunkfiles 162 and offsets within chunkfiles 162 for retrieving chunks 164 from storage system 115. Chunks 164 are written into chunkfiles 162 at different offsets. By comparing new chunk IDs to the chunk table, data protection manager 154 can determine if the data already exists on the system. If the chunks already exist, data can be discarded and metadata for an object may be updated to reference the existing chunk. Data protection manager 154 may use the chunk table to look up the chunkfile identifier for the chunkfile that contains a chunk.

Local storage system 105 may include a chunkfile table that describes respective physical or virtual locations of chunkfiles 162 on storage system 115, along with other metadata about the chunkfile, such as a checksum, encryption data, compression data, etc. In FIG. 2, data protection manager 154 causes a tree data structure to be stored to local storage system 105. In some examples, data protection manager 154 causes some or all of the tree data structure to be stored to storage system 115. Data protection manager 154, optionally or in conjunction with file system manager 152, may use the tree data structure and/or chunk metadata 232 to restore any of objects, snapshots 142, or both to a file system implemented by data platform 150, which may be presented by file system manager 152 to other systems.

Interface module 226 may execute an interface by which other systems or devices may determine operations of file system manager 152 or data protection manager 154. Another system or device may communicate via an interface of interface module 226 to specify one or more policies 158.

System 200 may be modified to implement an example of system 190 of FIG. 1B. In the modified system 200, chunkfiles 162 may be stored to a local storage system 115 to support snapshots 142.

Interface module 226 of storage system 115 may execute an interface by which other systems or devices may create, modify, delete, or extend a "write once read many" (WORM) lock expiration time for any of chunkfiles 162. Interface module 226 may execute and present an API. The interface presented by interface module 226 may be a gRPC, HTTP, RESTful, command-line, graphical user, web, or other interface. Interface module 226 may be associated with use costs. One more methods or functions of the interface module 226 may impose a cost per-use (e.g., $0.10 to extend a WORM lock expiration time of chunkfiles 162).

Although the techniques described in this disclosure are primarily described with respect to a snapshot function performed by a data protection manager of a data platform, similar techniques may additionally or alternatively be applied for an archive, replica, clone, or snapshot functions performed by the data platform. In such cases, snapshots 142 would be archives, replicas, clones, or snapshots, respectively.

Figure 3:
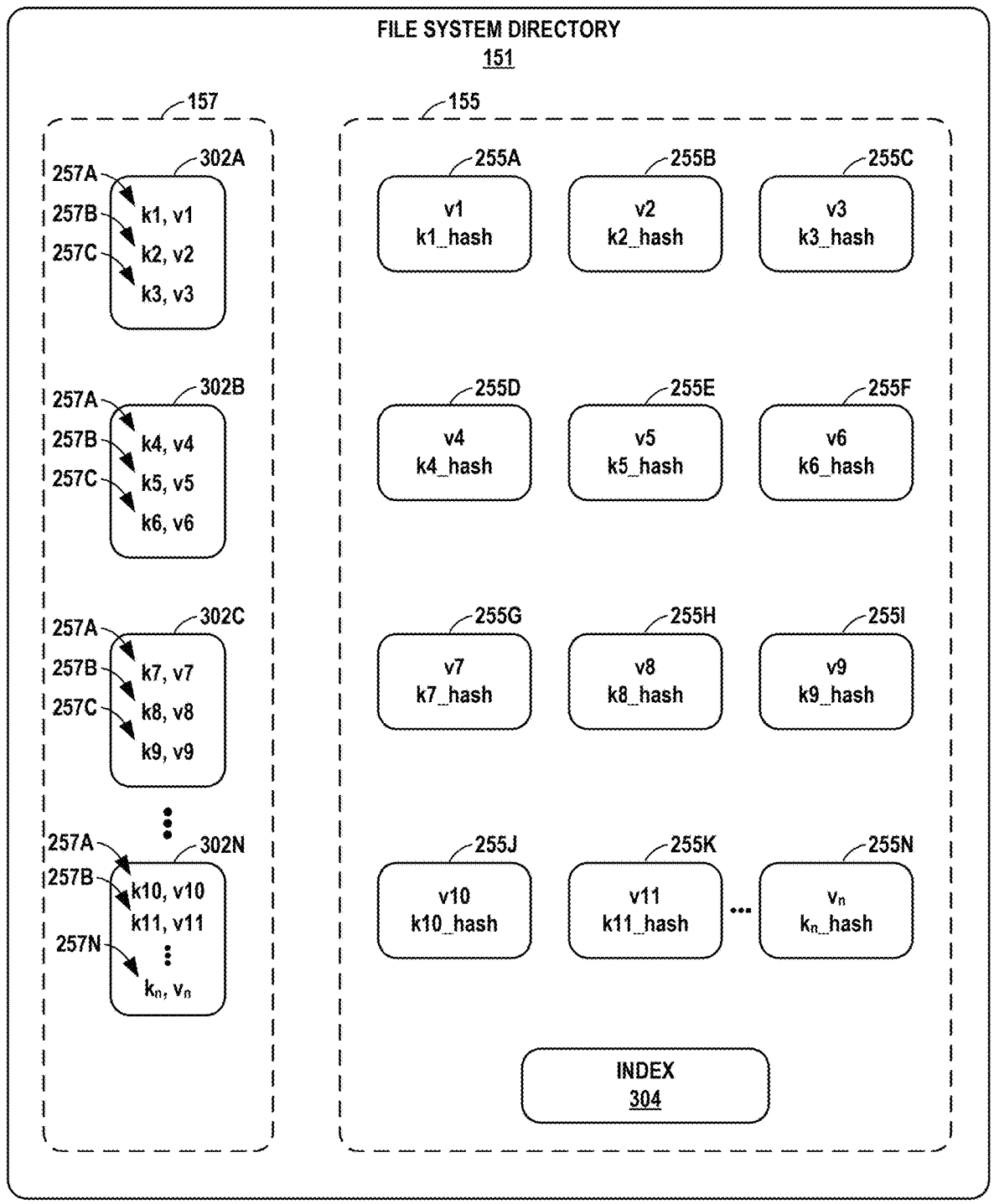
FIG. 3 is a block diagram illustrating an example of a file system directory, in accordance with techniques of this disclosure.

FIG. 3 is a block diagram illustrating an example of a file system directory, in accordance with techniques of this disclosure. FIG. 3 is described below in the context of FIG. 1A. As can be seen, file system directory 151 may include key map 157 and data store 155. Key map 157 may include key value pairs 257A-257N (collectively, "key-value pairs 257"). As shown in the example of FIG. 3 for instance, key-value pairs 257 respectively include keys k1-$k_n$ and values v1-$v_n$. As described above, each of the values of key-value pairs 257 may represent a value pointer to an entry of object metadata 255A-255N (collectively, "object metadata 255") stored to data store 155. Each of key-value pairs 257 may be stored at a respective storage location within key map 157. For example, key map 157 may store one or more of key-value pairs 257 at respective buckets 302A-302N (collectively, "buckets 302"), which may also be referred to herein as storage locations 302A-302N (collectively, "storage locations 302"). Though shown in the example of FIG. 3 as storing a particular number of key-value pairs 257, individual buckets 302 may store fewer or additional key-value pairs 257.

Lookup manager 156 may determine which of buckets 302 stores or should store a key-value pair of key-value pairs 257 with a hash function. As described above, lookup manager 156 may apply a hash function to each key to generate a hash, which may be referred to as a key hash. Lookup manager 156 may use the key hash to determine a bucket of buckets 302 within key map 157 where lookup manager 156 may locate the corresponding key-value pair and/or store the corresponding key-value pair in key map 157. For example, lookup manager 156 may distribute keys into buckets 302 of key map 157 by applying the hash function, whereby individual keys are assigned to particular buckets based on their respective key hashes. For instance, lookup manager 156 may apply the hash function to key "k1" to generate a key hash that identifies bucket 302A which key "k1" is or should be assigned to. To locate the key-value pair for key "k1", lookup manager 156 may locate the key-value pair including key "k1" within bucket 302A, such as by performing a search function through one or more key-value pairs in bucket 302A. To store such key-value pair including key "k1", lookup manager 156 may store the key-value pair such that the key-value pair is assigned to bucket 302A (e.g., is stored within bucket 302A).

As can be seen from the example of FIG. 3, data store 155 may include a plurality of entries of object metadata 255. Individual entries of object metadata 255 may each include metadata about a corresponding file or other object as well as a key hash of a corresponding key. As described above, lookup manager 156 may store, to entry of object metadata 255A, an indication of a bucket 302A of key map 157, such as in the form of a key hash. As can be seen from the example of FIG. 3 for instance, entries of object metadata 255 each include a respective key hash. For instance, entry of object metadata 255A includes key hash, "k1_hash," which is a key hash of key "k1", entry of object metadata 255B includes key hash, "k2_hash," which is a key hash of key "k2", entry of object metadata 255C include key hash, "k3_hash," which is a key hash of key "k3", and so on and so forth.

Lookup manager 156 may perform one or more forward lookups and one or more reverse lookups using file system directory 151. For example, to perform a forward lookup for a given key "k," lookup manager 156 may search key map 157 to obtain a key-value pair of key-value pairs 257 with a key that matches the given key "k." For instance, assuming for example purposes that the given key k matches key "k3" of key-value pair 257C, lookup manager may search key map 157 and retrieve key-value pair 257C. As can be seen, key-value pair 257C includes value v3, which represents a value pointer to entry of object metadata 255C, as shown by the "v3" label shown in entry of object metadata 255C in the example of FIG. 3.

As described above, lookup manager 156 may manage key map 157 such that keys of key map 157 are sorted or otherwise arranged for efficient access. For example, lookup manager 156 may store individual keys of key map 157 such that the keys are sorted (e.g., numerically, alphanumerically) or arranged into a search tree (e.g., binary search tree, B+ tree) to allow individual keys to be efficiently located in key map 157, such as through various search heuristics (e.g., binary search, depth first search, breadth first search) executed by lookup manager 156.

To perform a reverse lookup, given an inode ID or other object identifier, lookup manager 156 may search data store 155 to obtain an entry of object metadata 255 with an object identifier that matches the inode ID. For example, assuming "v3" is the given inode ID, lookup manager 156 may search data store 155 and obtain entry of object metadata 255C. As can be seen from FIG. 3, object metadata 255C is assigned to inode ID v3. Lookup manager 156 may read entry of object metadata 255C to obtain the key hash from entry of metadata 255C, in this example "k3_hash." Lookup manager 156 may use the key hash to identify the location of the corresponding key-value pair of key-value pairs 257. For example, key hash "k3_hash" may identify bucket 302A, which contains key-value pair 257C. Lookup manager 156 may read key-value pair 257C to obtain the key from key-value pair 257C. As described above, the key may be the object name. Accordingly, rather than exhaustively traversing through key-value pairs 257, such as in a brute force fashion, to find the key-value pair of key-value pairs 257 with a value pointer to the entry of object metadata 255 assigned to or including an object identifier that matches the inode ID, lookup manager 156 may utilize the key hash of object metadata 255C to directly locate the storage location, in this case bucket 302A, containing key-value pair 257C.

In some examples, data store 155 may include an index 304 that lookup manager 156 may use to locate individual entries of object metadata 255 in data store 154 using respective object identifiers. Index 304 may map object identifiers to respective entries of object metadata 255. For example, assuming "v1" is the object identifier for entry of object metadata 255A, index 304 may map "v1" to object metadata 255A, assuming "v2" is the object identifier for entry of object metadata 255B, index 304 may map v2 to object metadata 255B, assuming "v3" is the object identifier for entry of object metadata 255C, index 304 may map "v3" to object metadata 255C, and so on and so forth.

Lookup manager 156 may manage index 304 such that object identifiers are sorted or otherwise arranged for efficient access. For example, lookup manager 156 may store individual object identifiers such that the object identifiers are sorted (e.g., numerically, alphanumerically) or arranged into a search tree (e.g., binary search tree, B+ tree) to allow individual object identifiers to be efficiently found, such as through various search heuristics (e.g., binary search, depth first search, breadth first search). In this manner, given an object identifier, lookup manager 156 may efficiently search data store 155 for the corresponding entry of object metadata 255 and read the entry of object metadata such as to obtain a key hash that is stored therein.

In operation, lookup manager 156 may store key-value pairs 257 to key map 157 and corresponding entries of object metadata 255 to data store 155 in response to various file system events, such as the creation and/or renaming of an object. For example, lookup manager 156 may store key-value pair 257A for an object to key map 157 and entry of object metadata 255A for the object to data store 155 in response to creation of the object, such as at file system 153. As described above, lookup manager 156 may apply the hash function to key "k1" to generate a key hash that identifies bucket 302A which key "k1" is or should be assigned to. Lookup manager 156 may include the key hash in entry of object metadata 255A stored to data store 155. Lookup manager 156 may update key-value pair 257A for the object at key map 157 and entry of object metadata 255A for the object at data store 155 in response to a renaming of the object, such as at file system 153. For example, lookup manager 156 may update key-value pair 257A and/or entry of object metadata 255A such that the key of key-value pair 257A and/or entry of object metadata 255A respectively include the new name of the object. In response to other file system events, such as hard linking of the object, lookup manager 156 may ignore and/or clear (e.g., delete) key-value pair 257A corresponding to the object.

Figure 4:
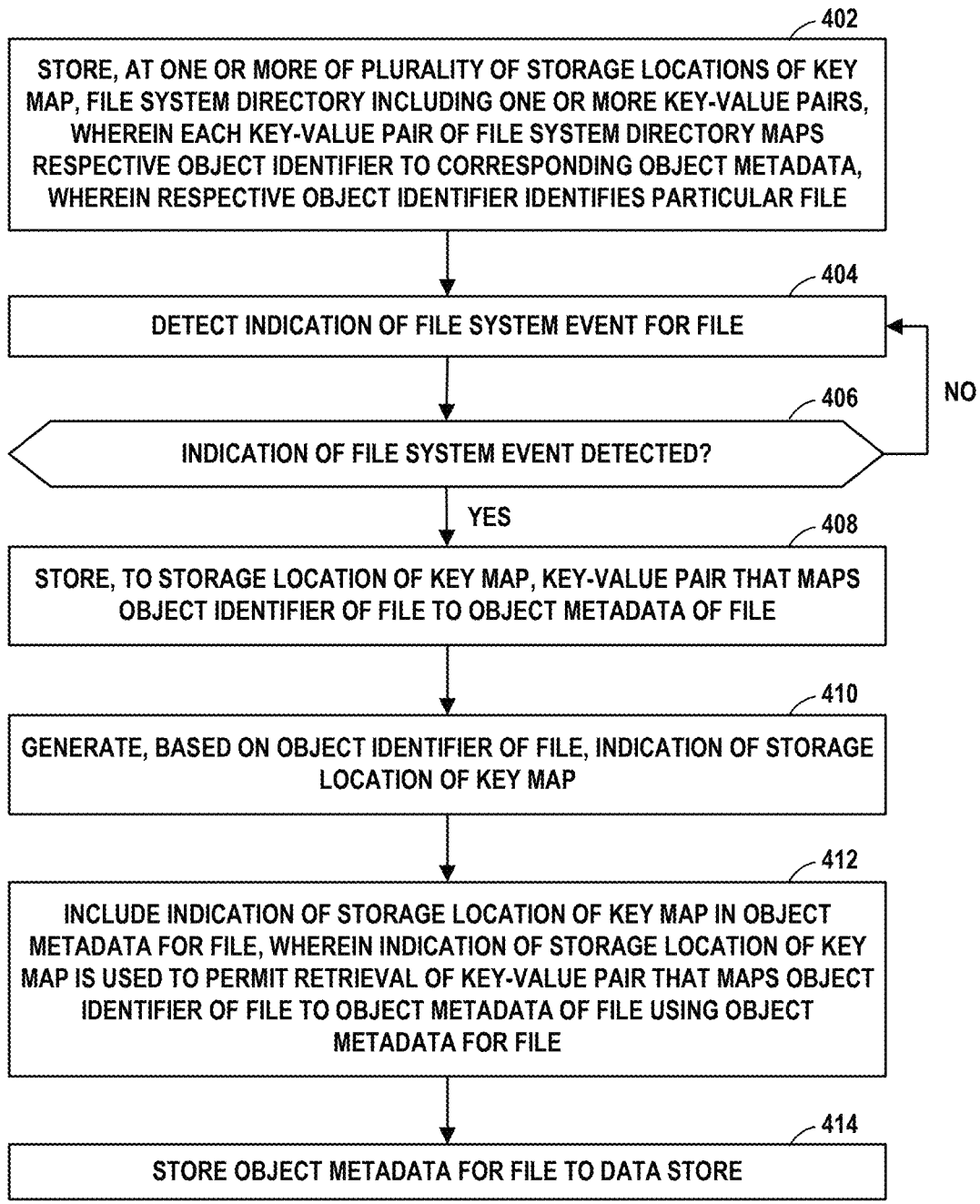
FIG. 4 is a flow chart illustrating an example operation of a data platform performing efficient file system directory reverse name lookup, in accordance with the techniques of this disclosure.

FIG. 4 is a flow chart illustrating an example operation of a data platform performing efficient file system directory reverse name lookup, in accordance with the techniques of this disclosure. FIG. 4 is described below in the context of FIGS. 1A-3.

Data platform 150, such as through lookup manager 156, may store, at one or more of a plurality of storage locations 302 of key map 157, file system directory 151 including one or more key-value pairs 257 (402). Each of key-value pairs 257 of file system directory 151 may map a respective object identifier to corresponding object metadata 255. For example, the respective object identifier may identify a particular file stored by data platform 150.

Lookup manager 156 may detect an indication of a file system event for a file or other object (404). Based on whether an indication of the file system event for the file is detected, lookup manager 156 may execute distinct functionality (406). For example, if the indication of the file system event is not detected, lookup manager 156 may return to step 404, such as to continue monitoring the file for an occurrence of a file system event. In response to detecting a file system event for the file, lookup manager 156 may store, for the file, a key-value pair 257 to key map 157 and an entry of object metadata 255 to data store 155 as will be described below. The indication of the file system event for the file may include a creation event for the file, a renaming event for the file, or a linking (e.g., hard linking) event for the file.

Lookup manager 156 may store, to a storage location 302A of key map 157, a key-value pair 257A that maps an object identifier of the file to an entry of object metadata 255A of the file (408). As such, the object identifier may correspond to the key of key-value pair 257A and entry of object metadata 255A may correspond to the value of key-value pair 257A. Rather than including the data of entry of object metadata 255A in key-value pair 257A, lookup manager may include a value pointer to entry of object metadata 255A in key-value pair 257A, such as described above. Lookup manager 156 may generate, based on the object identifier of the file, an indication of storage location 302A of key map 157 (410). For example, to generate the indication of storage location 302A lookup manager 156 may generate a hash of the object identifier of the file. Lookup manager 156 may truncate the hash of the object identifier, such as to conserve storage space at key map 157. Lookup manager 156 may include such indication of storage location 302A (e.g., the key hash) of key map 157 in entry of object metadata 255A for the file (412). For example, lookup manager 156 may embed the indication of storage location 302A within entry of object metadata 255A. As described above, the indication of storage location 302A may be used to permit retrieval of key-value pair 257A, which maps the object identifier of the file to object metadata 255A of the file, using entry of object metadata 255A. By including the indication of storage location 302A in entry of object metadata 255A, lookup manager 156 may retrieve key-value pair 257A directly from storage location 302A rather than performing a linear or other brute force traversal to find storage location 302A and/or key-value pair 257A. Lookup manager 156 reduces consumption of computing resources (e.g., processor, memory resources) in this manner. For example, lookup manager 156 may reduce processing complexity and corresponding processor resource consumption from O(n) to O(1). Lookup manager 156 may store entry of object metadata 255A for the file to data store 155 (414).

Lookup manager 156 may perform one or more reverse lookups using file system directory 151, such as to determine an object name using an object identifier. For example, data platform 150, such as through lookup manager 156, may receive a request including an indication of the object metadata of the file. For instance, lookup manager 156 may receive a request including an inode ID or other object identifier for the file from storage device 140X which may be performing a garbage collection or logical replication task. Lookup manager 156 may retrieve, based on the indication of the object metadata of the file, entry of object metadata 255A of the file from data store 155. Lookup manager 156 may determine, from entry of object metadata 255A, storage location 302A of key map 157. For example, lookup manager may read a key hash or other indication of storage location 302A from entry of object metadata 255A. Lookup manager 156 may retrieve key-value pair 257A from key map 157 from storage location 302A using the indication of storage location 302A. Lookup manager 156 may send a key of key-value pair 257A, such as to storage device 140X, to respond to the request. Such key may correspond to an object name of the file. For example, the object name of the file may include at least a portion of the file system path of the file.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

The detailed description set forth herein, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

In accordance with one or more aspects of this disclosure, the term "or" may be interrupted as "and/or" where context does not dictate otherwise. Additionally, while phrases such as "one or more" or "at least one" or the like may have been used in some instances but not others; those instances where such language was not used may be interpreted to have such a meaning implied where context does not dictate otherwise.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

In some examples, the functions described may include artificial intelligence (AI) that can include one or more machine learning (ML) models (e.g., decision tree, clustering, linear regression, Naïve Bayes, k nearest neighbors (kNN), large language models (LLMs)), which may be trained with example or training and validation data sets including validated data (e.g., human verified data) to receive input and infer, from the input, an output for use with the described functions. A ML model may include one or more neural networks trained to provide such output. For example, an ML model may receive input data in the form of natural language, numerical or other parameters, binary data, or other forms of data and determine, from such input, a natural language or other output that summarizes the input, explains the input, recognizes or classifies the input, or performs an action based on an inferred meaning or other AI-based recognition or classification of the input. The ML model may be trained through reinforcement, supervised, unsupervised, or other AI learning techniques.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the described techniques, but do not necessarily require realization by different hardware units. Rather, as described above, various units may be combined in a hardware unit or provided by a collection of interoperating hardware units, including one or more processors as described above, in conjunction with suitable software and/or firmware.

Aspects of this disclosure include the following examples.

Example 1: A method includes storing, by a data platform implemented by a computing system and at one or more of a plurality of storage locations of a key map, a file system directory including one or more key-value pairs, wherein each key-value pair of the file system directory maps a respective object identifier to corresponding object metadata, wherein the respective object identifier identifies a respective file of a plurality of files stored to the data platform; detecting, by the data platform, an indication of a file system event for a file of the plurality of files; and in response to detecting the indication of the file system event: storing, by the data platform and to a storage location of the key map, a key-value pair that maps an object identifier of the file to object metadata of the file; generating, by the data platform and based on the object identifier of the file, an indication of the storage location of the key map; including, by the data platform, the indication of the storage location of the key map in the object metadata for the file, wherein the indication of the storage location of the key map is used to permit retrieval of the key-value pair that maps the object identifier of the file to the object metadata of the file using the object metadata for the file; and storing, by the data platform, the object metadata for the file to a data store.

Example 2: The method of example 1, further includes receiving, by the data platform, a request including an indication of the object metadata of the file; retrieving, by the data platform and based on the indication of the object metadata of the file, the object metadata of the file from the data store; and determining, by the data platform and from the object metadata, the storage location of the key map.

Example 3: The method of example 2, further includes retrieving, by the data platform and from the storage location of the key map, the key-value pair that maps the object identifier of the file to the object metadata of the file; and sending, by the data platform, a key of the key-value pair to respond to the request, wherein the key corresponds to an object name of the file.

Example 4: The method of example 1, wherein generating the indication of the storage location of the key map comprises generating a hash of a key of the key-value pair.

Example 5: The method of example 4, wherein generating the indication of the storage location of the key map comprises truncating the hash of the key of the key-value pair.

Example 6: The method of example 1, wherein the object identifier of the file includes at least a portion of the file system path of the file.

Example 7: The method of example 1, wherein the indication of the file system event for the file includes one or more of a creation event for the file, a renaming event for the file, or a linking event for the file.

Example 8: A computing system includes a memory storing instructions; and processing circuitry that executes the instructions to: store, at one or more of a plurality of storage locations of a key map, a file system directory including one or more key-value pairs, wherein each key-value pair of the file system directory maps a respective object identifier to corresponding object metadata, wherein the respective object identifier identifies a respective file of a plurality of files stored to the data platform; detect an indication of a file system event for a file of the plurality of files; and in response to detecting the indication of the file system event: store, to a storage location of the key map, a key-value pair that maps an object identifier of the file to object metadata of the file; generate, based on the object identifier of the file, an indication of the storage location of the key map; include the indication of the storage location of the key map in the object metadata for the file, wherein the indication of the storage location of the key map is used to permit retrieval of the key-value pair that maps the object identifier of the file to the object metadata of the file using the object metadata for the file; and store the object metadata for the file to a data store.

Example 9: The computing system of example 8, wherein the processing circuitry executes the instructions to: receive a request including an indication of the object metadata of the file; retrieve, based on the indication of the object metadata of the file, the object metadata of the file from the data store; and determine, from the object metadata, the storage location of the key map.

Example 10: The computing system of example 9, wherein the processing circuitry executes the instructions to: retrieve, from the storage location of the key map, the key-value pair that maps the object identifier of the file to the object metadata of the file; and send a key of the key-value pair to respond to the request, wherein the key corresponds to an object name of the file.

Example 11: The computing system of example 8, wherein to generate the indication of the storage location of the key map the processing circuitry executes the instructions to generate a hash of a key of the key-value pair.

Example 12: The computing system of example 11, wherein to generate the indication of the storage location of the key map the processing circuitry executes the instructions to truncate the hash of the key of the key-value pair.

Example 13: The computing system of example 8, wherein the object identifier of the file includes at least a portion of the file system path of the file.

Example 14: The computing system of example 8, wherein the indication of the file system event for the file includes one or more of a creation event for the file, a renaming event for the file, or a linking event for the file.

Example 15: Non-transitory computer-readable storage media including instructions that, when executed, cause processing circuitry of a computing system to store, at one or more of a plurality of storage locations of a key map, a file system directory including one or more key-value pairs, wherein each key-value pair of the file system directory maps a respective object identifier to corresponding object metadata, wherein the respective object identifier identifies a respective file of a plurality of files stored to the data platform; detect an indication of a file system event for a file of the plurality of files; and in response to detecting the indication of the file system event: store, to a storage location of the key map, a key-value pair that maps an object identifier of the file to object metadata of the file; generate, based on the object identifier of the file, an indication of the storage location of the key map; include the indication of the storage location of the key map in the object metadata for the file, wherein the indication of the storage location of the key map is used to permit retrieval of the key-value pair that maps the object identifier of the file to the object metadata of the file using the object metadata for the file; and store the object metadata for the file to a data store.

Example 16: The non-transitory computer-readable storage media of example 15, wherein the instructions, when executed, cause the processing circuitry to: receive a request including an indication of the object metadata of the file; retrieve, based on the indication of the object metadata of the file, the object metadata of the file from the data store; and determine, from the object metadata, the storage location of the key map.

Example 17: The non-transitory computer-readable storage media of example 16, wherein the instructions, when executed, cause the processing circuitry to: retrieve, from the storage location of the key map, the key-value pair that maps the object identifier of the file to the object metadata of the file; and send a key of the key-value pair to respond to the request, wherein the key corresponds to an object name of the file.

Example 18: The non-transitory computer-readable storage media of example 15, wherein to generate the indication of the storage location of the key map the instructions, when executed, cause the processing circuitry to generate a hash of a key of the key-value pair.

Example 19: The non-transitory computer-readable storage media of example 18, wherein to generate the indication of the storage location of the key map the instructions, when executed, cause the processing circuitry to truncate the hash of the key of the key-value pair.

Example 20: The non-transitory computer-readable storage media of example 15, wherein the object identifier of the file includes at least a portion of the file system path of the file.

Various examples of the disclosure have been described. Any combination of the described systems, operations, or functions is contemplated

The invention claimed is:

1. A method comprising:
   storing, by a data platform implemented by a computing system and at one or more of a plurality of storage locations of a key map, a file system directory including one or more key-value pairs, wherein each key-value pair of the file system directory maps a respective object identifier to corresponding object metadata, wherein the respective object identifier identifies a respective file of a plurality of files stored to the data platform;
   detecting, by the data platform, an indication of a file system event for a file of the plurality of files; and
   in response to detecting the indication of the file system event:
      storing, by the data platform and to a storage location of the key map, a key-value pair that maps an object identifier of the file to object metadata of the file;
      generating, by the data platform and based on the object identifier of the file, an indication of the storage location of the key map;

including, by the data platform, the indication of the storage location of the key map in the object metadata for the file, wherein the indication of the storage location of the key map is used to permit retrieval of the key-value pair that maps the object identifier of the file to the object metadata of the file using the object metadata for the file; and storing, by the data platform, the object metadata for the file to a data store.

2. The method of claim 1, further comprising:

receiving, by the data platform, a request including an indication of the object metadata of the file;

retrieving, by the data platform and based on the indication of the object metadata of the file, the object metadata of the file from the data store; and determining, by the data platform and from the object metadata, the storage location of the key map.

3. The method of claim 2, further comprising:

retrieving, by the data platform and from the storage location of the key map, the key-value pair that maps the object identifier of the file to the object metadata of the file; and sending, by the data platform, a key of the key-value pair to respond to the request, wherein the key corresponds to an object name of the file.

4. The method of claim 1, wherein generating the indication of the storage location of the key map comprises generating a hash of a key of the key-value pair.

5. The method of claim 4, wherein generating the indication of the storage location of the key map comprises truncating the hash of the key of the key-value pair.

6. The method of claim 1, wherein the object identifier of the file includes at least a portion of a file system path of the file.

7. The method of claim 1, wherein the indication of the file system event for the file includes one or more of a creation event for the file, a renaming event for the file, or a linking event for the file.

8. A computing system comprising:

a memory storing instructions; and processing circuitry that executes the instructions to:

store, at one or more of a plurality of storage locations of a key map, a file system directory including one or more key-value pairs, wherein each key-value pair of the file system directory maps a respective object identifier to corresponding object metadata, wherein the respective object identifier identifies a respective file of a plurality of files stored to a data platform executed by one or more computing devices;

detect an indication of a file system event for a file of the plurality of files; and in response to detecting the indication of the file system event:

store, to a storage location of the key map, a key-value pair that maps an object identifier of the file to object metadata of the file;

generate, based on the object identifier of the file, an indication of the storage location of the key map;

include the indication of the storage location of the key map in the object metadata for the file, wherein the indication of the storage location of the key map is used to permit retrieval of the key-value pair that maps the object identifier of the file to the object metadata of the file using the object metadata for the file; and store the object metadata for the file to a data store.

9. The computing system of claim 8, wherein the processing circuitry executes the instructions to:

receive a request including an indication of the object metadata of the file;

retrieve, based on the indication of the object metadata of the file, the object metadata of the file from the data store; and determine, from the object metadata, the storage location of the key map.

10. The computing system of claim 9, wherein the processing circuitry executes the instructions to:

retrieve, from the storage location of the key map, the key-value pair that maps the object identifier of the file to the object metadata of the file; and send a key of the key-value pair to respond to the request, wherein the key corresponds to an object name of the file.

11. The computing system of claim 8, wherein to generate the indication of the storage location of the key map the processing circuitry executes the instructions to generate a hash of a key of the key-value pair.

12. The computing system of claim 11, wherein to generate the indication of the storage location of the key map the processing circuitry executes the instructions to truncate the hash of the key of the key-value pair.

13. The computing system of claim 8, wherein the object identifier of the file includes at least a portion of a file system path of the file.

14. The computing system of claim 8, wherein the indication of the file system event for the file includes one or more of a creation event for the file, a renaming event for the file, or a linking event for the file.

15. Non-transitory computer-readable storage media comprising instructions that, when executed, cause processing circuitry of a computing system to:

store, at one or more of a plurality of storage locations of a key map, a file system directory including one or more key-value pairs, wherein each key-value pair of the file system directory maps a respective object identifier to corresponding object metadata, wherein the respective object identifier identifies a respective file of a plurality of files stored to a data platform executed by one or more computing devices;

detect an indication of a file system event for a file of the plurality of files; and in response to detecting the indication of the file system event:

store, to a storage location of the key map, a key-value pair that maps an object identifier of the file to object metadata of the file;

generate, based on the object identifier of the file, an indication of the storage location of the key map;

include the indication of the storage location of the key map in the object metadata for the file, wherein the indication of the storage location of the key map is used to permit retrieval of the key-value pair that maps the object identifier of the file to the object metadata of the file using the object metadata for the file; and store the object metadata for the file to a data store.

16. The non-transitory computer-readable storage media of claim 15, wherein the instructions, when executed, cause the processing circuitry to:

receive a request including an indication of the object metadata of the file;

retrieve, based on the indication of the object metadata of the file, the object metadata of the file from the data store; and determine, from the object metadata, the storage location of the key map.

17. The non-transitory computer-readable storage media of claim 16, wherein the instructions, when executed, cause the processing circuitry to:

retrieve, from the storage location of the key map, the key-value pair that maps the object identifier of the file to the object metadata of the file; and send a key of the key-value pair to respond to the request, wherein the key corresponds to an object name of the file.

18. The non-transitory computer-readable storage media of claim 15, wherein to generate the indication of the storage location of the key map the instructions, when executed, cause the processing circuitry to generate a hash of a key of the key-value pair.

19. The non-transitory computer-readable storage media of claim 18, wherein to generate the indication of the storage location of the key map the instructions, when executed, cause the processing circuitry to truncate the hash of the key of the key-value pair.

20. The non-transitory computer-readable storage media of claim 15, wherein the object identifier of the file includes at least a portion of a file system path of the file.

* * * * *